United States Patent
Hadari et al.

(10) Patent No.: US 7,792,886 B2
(45) Date of Patent: Sep. 7, 2010

(54) SYSTEMS AND METHODS FOR MONITORING AND CONTROLLING WAREHOUSE ACTIVITIES

(75) Inventors: Malkiel Hadari, Hod-Hasharon (IL); Orit Harel, Kadima (IL); Alla Volkov, Netanya (IL); Ziv Holzman, Tel-Aviv (IL); Bernd Ernesti, Wiesloch (DE); Hanna Kieser, Wiesloch (DE)

(73) Assignee: SAP AG, Walldorf (DE)

(*) Notice: Subject to any disclaimer, the term of this patent is extended or adjusted under 35 U.S.C. 154(b) by 286 days.

(21) Appl. No.: 11/320,981

(22) Filed: Dec. 30, 2005

(65) Prior Publication Data

US 2007/0162435 A1    Jul. 12, 2007

(51) Int. Cl.
*G06F 17/30* (2006.01)
*G06F 12/00* (2006.01)

(52) U.S. Cl. .............. 707/999.004; 707/790; 707/797; 707/821; 707/829; 707/831

(58) Field of Classification Search .......... None
See application file for complete search history.

(56) References Cited

U.S. PATENT DOCUMENTS

| | | | | |
|---|---|---|---|---|
| 5,754,938 A * | 5/1998 | Herz et al. | ............ | 725/116 |
| 5,760,770 A * | 6/1998 | Bliss et al. | ............ | 715/745 |
| 5,838,965 A * | 11/1998 | Kavanagh et al. | ........ | 707/103 R |
| 5,936,860 A * | 8/1999 | Arnold et al. | ............ | 700/95 |
| 6,026,378 A * | 2/2000 | Onozaki | ............ | 705/28 |
| 6,111,579 A * | 8/2000 | Alimpich et al. | ............ | 715/853 |
| 6,523,027 B1 * | 2/2003 | Underwood | ............ | 1/1 |
| 6,633,878 B1 * | 10/2003 | Underwood | ............ | 1/1 |
| 6,714,979 B1 * | 3/2004 | Brandt et al. | ............ | 709/225 |
| 6,750,766 B1 * | 6/2004 | Heitner et al. | ............ | 340/525 |
| 7,024,414 B2 * | 4/2006 | Sah et al. | ............ | 1/1 |
| 7,076,475 B2 * | 7/2006 | Honarvar | ............ | 706/47 |
| 2002/0007287 A1 * | 1/2002 | Straube et al. | ............ | 705/3 |
| 2002/0072922 A1 * | 6/2002 | Suzuki et al. | ............ | 705/1 |
| 2003/0110469 A1 * | 6/2003 | Jackson | ............ | 717/113 |
| 2004/0215627 A1 * | 10/2004 | Whalen et al. | ............ | 707/100 |
| 2005/0027651 A1 * | 2/2005 | DeVault | ............ | 705/38 |
| 2005/0187937 A1 * | 8/2005 | Kawabe et al. | ............ | 707/9 |
| 2005/0240881 A1 * | 10/2005 | Rush et al. | ............ | 715/851 |

* cited by examiner

*Primary Examiner*—Yicun Wu
*Assistant Examiner*—Yu Zhao
(74) *Attorney, Agent, or Firm*—Finnegan, Henderson, Farabow, Garrett & Dunner, LLP

(57) ABSTRACT

Methods, systems, and computer-readable media are provided for monitoring and controlling warehouse activities. Inbound information reflecting the status of wares destined for storage in a warehouse is monitored. Internal information reflecting movement of the wares within the warehouse is also monitored. Additionally, outbound information reflecting outbound processing of the wares is monitored. The status of the warehouse is presented based on at least one of the inbound information, internal information, and outbound information.

26 Claims, 18 Drawing Sheets

Selection criteria for node Outbound ⇒ Wave ⇒ Bundle

Wave

| | | |
|---|---|---|
| Wave Number | | bis |
| Wave Type | | bis |
| Status | | bis |
| Planned Pick Completion Time | 22.01.2004 | bis |
| Planned Pack Completion Time | | bis |
| Planned Load Completion Time | | bis |

Bundle

| | | |
|---|---|---|
| Bundle Number | | bis |
| Status | on hold | bis |
| ... | | bis |

Check | Save as Default | Generate variant node | Single Values Only

SYSTEMS AND METHODS FOR MONITORING AND CONTROLLING WAREHOUSE ACTIVITIES

BACKGROUND OF THE INVENTION

1. Field of the Invention

The present invention generally relates to data processing. More particularly, the invention relates to systems, methods and computer-readable media for allowing users to monitor and control warehouse activities.

2. Background Information

In the modem corporate landscape, effective Supply Chain Management (SCM) is vital to success. A crucial aspect of an effective SCM strategy is warehouse management. The ability for an enterprise to manage its warehouses can streamline supply chain processes and production, improve workforce productivity, and reduce redundancies, translating into reduced costs and increased profits.

Often, warehouse management includes controlling warehouse processes, as well as allocating and scheduling warehouse resources. To perform these tasks optimally, warehouse transparency is required. That is, the ability of an enterprise to effectively manage its warehouse processes and resources often requires a corresponding capability to monitor and view warehouse activities (e.g., work-in-process, workload phases, inventory levels, etc.) in an efficient manner. For example, warehouse resource allocation and scheduling may depend upon the status of various warehouse workload phases as well as expected workloads. The ability for an enterprise to efficiently monitor and view such workload information may therefore be vital to successful warehouse management.

Conventional SCM and other business applications systems are deficient with respect to warehouse management. In particular, conventional systems may not allow an enterprise to effectively monitor and control warehouse activities so as to effect optimal warehouse management.

SUMMARY

Consistent with embodiments of the present invention, methods, systems and computer-readable media are disclosed for monitoring and/or controlling warehouse activities as part of warehouse management.

Consistent with the present invention, a method for monitoring warehouse activities may be provided. The method may comprise: monitoring inbound information reflecting the status of wares destined for storage in a warehouse; monitoring internal information reflecting movement of the wares within the warehouse; monitoring outbound information reflecting outbound processing of the wares; and presenting the status of the warehouse based on at least one of the inbound information, internal information, and outbound information.

Consistent with the present invention, a method of monitoring a warehouse may be provided. The method may comprise: obtaining information reflecting data objects associated with warehouse activities from a warehouse management application; organizing the obtained information into a hierarchical tree of nodes, each of the nodes representing a class and including data objects corresponding to the class; presenting the tree to a user; receiving at least one instruction from a user selecting one of the nodes; and displaying the data objects corresponding to the selected node.

Consistent with the present invention, a system for monitoring warehouse activities may be provided. The system may comprise: an inbound monitor that monitors inbound information reflecting the status of wares destined for storage in a warehouse; an internal monitor that monitors internal information reflecting movement of the wares within the warehouse; an outbound monitor that monitors outbound information reflecting outbound processing of the wares; and a presentation module that presents the status of the warehouse based on at least one of the inbound information, internal information, and outbound information.

Consistent with the present invention, a data structure maintained in a data repository may be provided. The data structure may comprise: a first node representing a category; a set of child nodes associated with the category, the set of child nodes including an inbound warehouse activity node, an outbound warehouse activity node and an internal warehouse activity node; a set of document nodes associated with the set of child nodes, the document nodes including information reflecting documents associated with inbound warehouse activities, outbound warehouse activities, and internal warehouse activities; and a set of process nodes associated with the set of child nodes, the process nodes including information reflecting process steps associated with the inbound warehouse activities, the outbound warehouse activities, and the internal warehouse activities.

Consistent with the present invention, a computer-readable medium containing instructions for controlling a computer system to perform a method may be provided. The computer system may have a processor for executing the instructions. The method may comprise: monitoring inbound information reflecting the status of wares destined for storage in a warehouse; monitoring internal information reflecting movement of the wares within the warehouse; monitoring outbound information reflecting outbound processing of the wares; and presenting the status of the warehouse based on at least one of the inbound information, internal information, and outbound information.

The foregoing background and summary are not intended to be comprehensive, but instead serve to help artisans of ordinary skill understand the following implementations consistent with the invention set forth in the appended claims. In addition, the foregoing background and summary are not intended to provide any independent limitations on the claimed invention.

BRIEF DESCRIPTION OF THE DRAWINGS

The accompanying drawings, which are incorporated in and constitute a part of this specification, illustrate various embodiments of the present invention and, together with the corresponding written description, serve to explain principles associated with the invention. In the drawings:

FIGS. 8A and 8B illustrate aspects of managing and selecting node options consistent with embodiments of the present invention;

DETAILED DESCRIPTION

Figure 1:
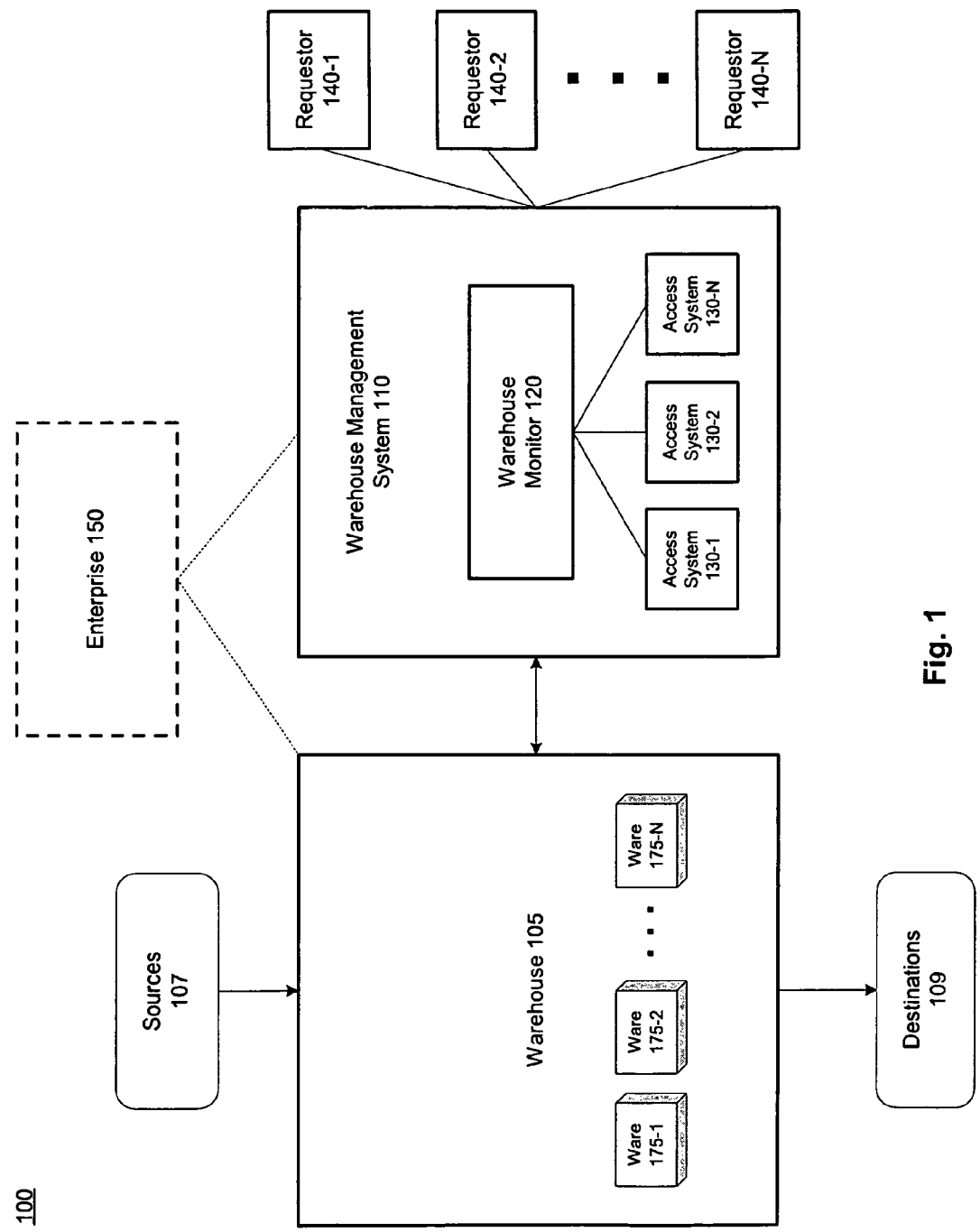
FIG. 1 is a block diagram of an exemplary enterprise environment consistent with embodiments of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with embodiments of the present invention facilitate the monitoring and control of data, such as warehouse data. For example, embodiments of the invention may be used for monitoring inbound, outbound, and internal processes associated with a warehouse. In addition, embodiments of the present invention may be used for monitoring problematic situations in the warehouse. As further disclosed herein, embodiments of the invention may generate various user interfaces that allow an enterprise to monitor and control one or more of its warehouses.

FIG. 1 illustrates an exemplary enterprise environment 100 consistent with embodiments of the present invention. The illustrated components are exemplary only, and environment 100 may comprise additional and/or fewer components. As illustrated in FIG. 1, enterprise 100 may include a warehouse 105 and a warehouse management system 110, which may be associated with one or more enterprises 150. As used herein, the term "enterprise" refers to any business-related entity, such as a corporation, firm, partnership, sole proprietorship, conglomeration, etc.

Warehouse 105 may represent any location, structure or facility for storing wares (175(1-N)) associated with enterprise 150. As used herein, the term "ware" refers to any product, good, merchandise, material, document, resource, etc. handled by warehouse 105. Wares 175 may include manufacturing parts, finished products, and service parts. Non-limiting examples of "wares" include mechanical parts, electronic components, electrical systems, building materials, industrial and/or commercial products/parts, chemicals, vehicles, machines, natural resources, pharmaceutical items, medical equipment, defense systems, computer devices, office supplies, furniture, food items, and articles of clothing. Warehouse 105 may serve as an intermediary between ware sources 107 (e.g., manufactures of wares 175) and ware destinations 109 (e.g., retailers or sellers of wares 175).

Warehouse management system 110 may include one or more hardware, software, and/or firmware components for managing and executing activities associated with warehouse 105. As used herein, the term "warehouse activity" refers to any activity, process, transaction, and/or change in status related to warehouse 105, including inbound processes, outbound processes, and internal warehouse processes. Additional details of inbound processes, outbound process, and internal warehouse processes are discussed below in connection with FIG. 2. Warehouse management 110 may include one or more associated management components (e.g., computers, servers, handheld devices, RF devices, scanners, automated loading and unloading devices, packing devices, etc.) that collaboratively facilitate management and execution of warehouse activities. Warehouse management system 110 may also include one or more software applications, such as enterprise software applications compatible with the R/3 application system provided by SAP Aktiengesellschaft, Walldorf, Germany.

Warehouse management system 110 may be implemented in a supply chain infrastructure associated with enterprise 150. In certain embodiments, warehouse management system 110 may be implemented as a subsystem within, or integrated with, a broader business application associated with enterprise 150. For example, warehouse management system 110 may be implemented within or together with a Customer Relationships Management (CRM), Supply Chain Management (SCM) system, or Enterprise Resource Management (ERP) application. Although depicted as separate from warehouse 105, all or part of warehouse management system 110 may be located or dispersed within warehouse 105.

Warehouse management system 110 may include logic for processing requests from one or more systems (e.g., requestors 140(1-N)) interacting with management system 110. Requestors 140 may include purchasing systems, sales order systems, order fulfillment systems, CRM applications, etc. In one configuration, warehouse management system 110 may process Electronic Data Interchange (EDI) transactions. Warehouse management system 110 may also interact with various systems using the Standard Generalized Markup Language (SGML), extendible Markup Language (XML), Electronic Business XML (ebXML) and/or any other language that facilitates the creating and sharing of common information formats. Warehouse management system 110 may additionally include and/or leverage one or more validation processes and languages, such as Tree Regular Expressions (TREX).

In one embodiment, warehouse management system 110 may process waves. As used herein, the term "wave" refers to a data object or unit of execution that identifies one or more "ware requests" grouped according to one or more characteristics. A "ware request" refers to any request for warehouse 105 to handle a quantity of wares. Ware requests may originate from various requesting systems (e.g., requestors 140(1-N)), which may represent purchasing systems, sales order systems, CRM systems, etc. associated with enterprise 150. The requesting systems may also be associated with third parties, such as customers, retailers, external manufacturers, etc. A warehouse request may include the necessary information for executing, monitoring, and fulfilling the request.

Warehouse management system 110 may also receive, process, and/or issue transfer orders. A transfer order ("TO") refers to an instruction to move wares from a source location (such as a source storage bin) to a destination location (such as a destination storage bin) within warehouse 105. A particular TO may be included in a request received from a requesting system and may contain information, such as an identification of the ware and the quantity to be moved, the source and destination locations, and shipping information.

As illustrated in FIG. 1, warehouse management system 110 may include one or more warehouse monitors 120. In one embodiment, a particular warehouse monitor 120 may be implemented as a software application embedded within warehouse management system 110. Warehouse monitor 120 may allow enterprise 150 to view and control various warehouse activities and workloads. Warehouse monitor 120 may provide users associated with enterprise 150 with information reflecting various documents and data objects that are associated with warehouse 105 and controlled and/or stored by management system 110. Warehouse monitor 120 may also provide users with various analysis results, such as analyses of ware requests, waves, or TOs. Information provided by warehouse monitor 120 may facilitate strategic decision making. For example, users may view specific information in order to make cost/benefit decisions, ware routing decisions, and other types of decisions associated with the warehouse environment. Warehouse monitor 120 may also allow users to control various warehouse activities. For example, users may control various applications and systems tasked with implementing warehouse activities through warehouse monitor 120, such as automated loading and packing systems.

Users may access a particular warehouse monitor 120 via one or more access systems 130(1-N). Access systems 130 may include general-purpose computers, personal computers (e.g., a desktop), or workstations. Access systems 130 may also include mobile computing devices (e.g., laptops, PDAs, a Blackberry™, an Ergo Audrey™, etc.), mobile communications devices (e.g., cell phones), or other structures that enable users to remotely access information. In certain configurations, access systems 130 could include kiosks or "dumb" terminals coupled to one or more central data processing systems. Access systems 130 may be implemented as part of warehouse management system 110 and/or may be located in close proximity to warehouse management system 110. Alternatively, access systems 130 may be located external to warehouse management system 110 and may remotely interact with warehouse monitor 120 via a network (not shown). Exemplary implementation details of access systems 130 are discussed below in connection with FIG. 9.

Although depicted as part of warehouse management system 110, warehouse monitor 120 could be implemented as a separate system or application, which could interact with warehouse management system 110. In such embodiments, warehouse monitor 120 could be remotely located with respect to management system 110. Further, users may access warehouse monitor 120 directly without access systems 130. For example, warehouse monitor 120 may be located on a data processing system (within or outside of management system 110) accessible to users associated with enterprise 150.

Figure 2:
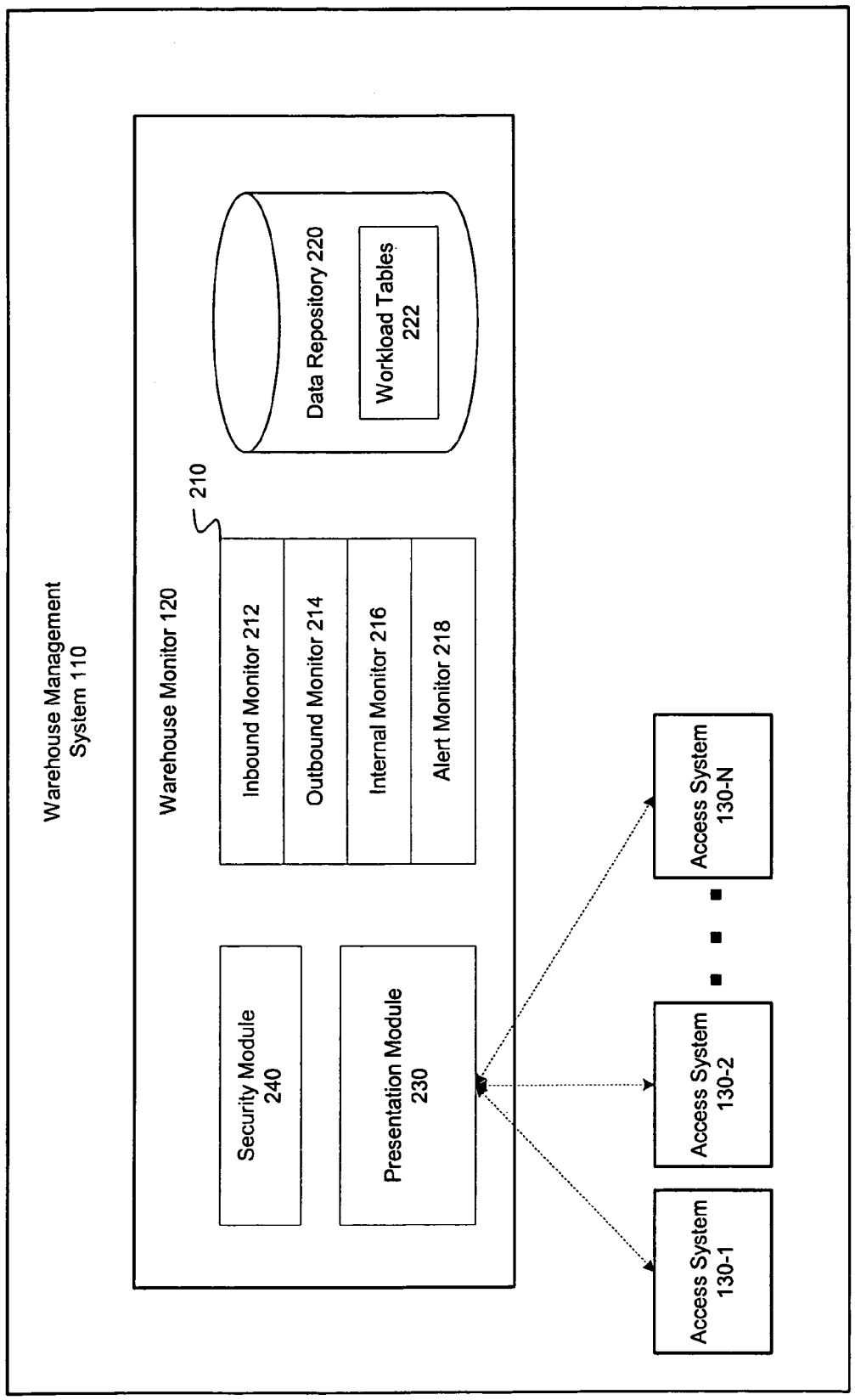
FIG. 2 is a block diagram of a monitoring system consistent with embodiments of the present invention.

FIG. 2 is an exemplary implementation of a warehouse monitor 120 consistent with the present invention. As illustrated, warehouse monitor 120 may include a monitoring module 210, a data repository 220, a presentation module 230, and a security module 240.

Monitoring module 210 may include software, hardware, and/or firmware for monitoring various warehouse activities. Monitoring module 210 may track information reflecting various documents and data objects associated with warehouse 105. For example, monitoring module 210 may track, and allow users to view, information associated with one or more of the following: ware sources, conveyances, conveyance unload sequences, conveyance yard location, carrier references, advance ship notice (ASN) numbers, ASN dates, receipt types (base, returns, claims, stocks, TOs, etc.), expected receipt arrival dates/times, supplier ship dates, number of handling units, materials, priority, country of origin, number and details of receipt lines, weight, volume, timestamps, customers, elapsed on-site hours, employees, receiving areas, putaway areas, dock number, extra or missing handling units, inspection bays, destination quality, spread location, ware receipt dates, etc.

In one embodiment, warehouse management system 110 may manage the various documents and data objects and may store information reflecting the documents and data objects in data repository 220. Monitoring module 210 may interact with data repository 220 to obtain or track the information stored in repository 220. Monitoring module 210 may also obtain information from requestors 140, various systems and applications within warehouse management system 110, and other business logic systems associated with enterprise 150.

As described above, in certain embodiments, warehouse management system 110 may include enterprise software applications compatible with an R/3 application system. In such embodiments, monitoring module 210 may receive or track various documents from R/3 system components stored in repository 220. For example, when an ASN is received by an R/3 system, an R/3 inbound delivery may be created and downloaded to warehouse management system 110 to create a request document for storage in repository 220. Monitoring module 210 may then track or obtain that request document.

Monitoring module 210 may present information reflecting different combinations of data objects and/or documents depending on the particular warehouse activity, and/or may allow users to select various data objects and/or documents to view. For example, for a pick from receiving (PFR) activity, monitoring module 210 may track the following data elements: carrier, conveyance, ware number, ASN number, receipt type, material, priority, country of origin, customer, order number, and timestamp. As another example, after wares have been moved to a putaway staging bay, monitoring module 210 may provide access to the following data elements: planned completion timestamp, handling unit number, receipt type, material, priority, country of origin, putaway location, and actual completion timestamp.

Monitoring module 210 may also provide information responsive to general inquires pertaining to receipts of wares at warehouse 105. Non-limiting examples of the data elements that could be provided in response to such a query include: planned completion timestamp, last receipt date, last receipt inquiry, receipt type, material, country of origin, receiving area, spreading area, putaway area, total handling units, etc.

Consistent with the present invention, monitoring module 210 may include hardware, software, and/or firmware for calculating and/or projecting workloads associated with various aspects of warehouse activities. Monitoring module 210 may allow enterprise 150 to track and control workloads associated with various phases (e.g., picking, packing, staging, and loading) of an outbound process. Monitoring module 210 may calculate or project a workload of a process phase by examining one or more documents and/or data objects associated with that phase. For example, monitoring module 210 may calculate a workload by examining TOs, stock items, handling units, etc. The particular documents and/or data objects that should be considered for determining a workload may be maintained in a pre-determined and stored process profile. In one embodiment, a workload table 222 could be stored in data repository 220 that contains pointers to all objects and documents that contribute to the workload of a particular process phase.

Monitoring module 210 may also track the execution progress of various workloads by calculating the percentage of executed work from the total workload. For example, monitoring module 210 could calculate outbound execution progress and inbound execution progress.

In certain embodiments, monitoring module 210 may, in conjunction with components in warehouse management system 110, perform performance indicator calculations (e.g., Key Performance Indicator calculations, etc.) based on information reflecting documents and data associated with warehouse 105. Monitoring module 210 could also facilitate On-line Analytical Processing (OLAP) and data mining.

As illustrated in FIG. 2, monitoring module 210 may include an inbound monitor 212, an outbound monitor 214, an internal monitor 216, and an alert monitor 218. Although monitors 212, 214, 216, and 218 are depicted as discrete elements, the functionality of the monitors may overlap and exist in a fewer (or greater) number of modules. Further, in certain implementations, monitoring module 210 may not include one or more functions associated with monitors 212, 214, 216, and 218. Moreover, monitoring module 210 may include additional components and functionality not illustrated in FIG. 2.

Inbound monitor 212 may track current and expected warehouse receiving activities. Current receiving activities may include warehouse activities occurring from the unloading of wares at warehouse 105 to the placement of the wares in their destination in warehouse 105. Non-limiting examples of current receiving activities include unloading, spreading, packaging, putaway, inspection, counting, testing, and order processing. Inbound monitor 212 may also allow enterprise 150 to view expected activities, for example, by allowing enterprise 150 to view the status of wares in transit to warehouse 105 and wares received at warehouse 105, but not yet unloaded. Inbound monitor 212 may allow enterprise 150 to view various aspects, objects, and/or phases of a particular current or expected receiving activity. For example, inbound monitor 212 may provide details associated with transport units, trailers, materials, ASN statuses, handling units, transfer orders, etc. Each receiving activity or activity phase may be bound by a specific completion time, such as unloading completion time, spreading completion time, packaging completion time, etc. These completion times can be set based on a predefined duration for each activity.

Inbound monitor 212 may measure and present workloads for inbound process phases, such as unloading, counting, spreading, and putaway operations. The unloading workload can be calculated, for example, by considering the open unload transfer orders. For counting wares 175, the workload could be reflected by various handling units associated with a counting station. The workload for spreading wares 175 throughout warehouse 105 can be determined by examining handling units and the wares in those handling units that need to be spread. The putaway workload could be determined by examining putaway transfer orders.

Outbound monitor 214 tracks outbound activities and order fulfillment activities associated with warehouse 105. In one embodiment, outbound monitor 214 may monitor ware requests. Outbound monitor 214 may also monitor and control waves. Outbound monitor 214 may allow enterprise 150 to view and modify wave attributes, releases, statuses, and population. Outbound monitor 214 may also monitor and control ware requests received by warehouse management system 110 but not yet assigned to a wave.

Outbound monitor 214 may determine and present workloads for outbound process phases, such as picking, packing, staging, and loading. The picking workload can be calculated, for example, by considering the open transfer orders. For packing, the workload could be reflected by the transfer orders needing picking and the wares in the pick handling unit. The staging and loading workloads can be determined by examining the open pick transfer orders, the wares in the pick handling units, and the pick and ship handling units.

Internal monitor 216 may allow enterprise 150 to track and control internal activities associated with warehouse 105. Internal activities may include ware replenishment, scrapping and internal ware movement (e.g., re-arrangement). Internal monitor 216 may also measure and present workloads for internal process phases.

Alert monitor 218 may alert enterprise 150 of problematic situations associated with warehouse 105 in order to minimize management risks, predict problems, and facilitate decision making. Alert monitor 218 may include logic for triggering alerts. For example, alert monitor 218 may include exception logic that triggers an alert in response to parameters exceeding defined thresholds. Alert monitor 218 may alert enterprise 150 of problematic situations occurring during inbound, outbound, and internal processes.

In one embodiment, alert monitor 218 may track work that is past the scheduled/planned completion time. Alert monitor 218 may track the overall progress of past due (or other problematic) work as well as details of the work. This functionality may allow users to view the overall progress and then drill down to determine specific causes of the delay or problem. As an example, assume an unloading process was completed on time but the wares arrived late at the putaway area because they were not spread within the allotted time. In this situation, alert monitor 218 may track information that would allow a user to determine that the reason for the delay was that spreading occurred past completion time. Alert monitor 218 may also generate messages that alert supervisors to the situation and alert the putaway crew to process the wares. In addition to tracking past due work, alert monitor 218 may track backlogs, current work, and future work.

Data repository 220 may store information related to documents and data objects handled and/or generated by warehouse management system 110. Although illustrated as a components of warehouse monitor 120, data repository 220 could be separate from and located external to monitor 120. For example, data repository could be maintained by warehouse management system 110 and remotely located with respect to monitor 120. In such embodiments, warehouse monitor 120 could retrieve data objects and documents indirectly from data repository 220 by interacting with management system 110. Data repository 220 may include any resource, facility, or lexicon, operable to maintain and access information. In certain embodiments, data repository 220 may include one or more structured data archives that could be distributed among one or more network-based data processing systems. Data repository 220 may include one or more relational databases and management systems (e.g., Oracle databases, DB2, MS SQL, etc.), distributed databases, and/or object-oriented programming databases. Data repository 220 may organize data hierarchically and across several dimensions. It may also include and/or leverage one or more schemes (e.g., file systems) for managing the stored information.

Presentation module 230 may include hardware, software, and/or firmware for providing one or more user interfaces through which users can interact with warehouse monitor 120. Presentation module 230 may interact with one or more access systems 130. Presentation module 230 may generate presentations of information tracked by one or more monitors (i.e., 212, 214, 216 and 218) within monitor module 210. A "presentation" may include any depiction or portrayal of information, including visual (e.g., graphical) portrayals, audible presentations, simulations, virtual demonstrations, etc. Presentation module 230 may provide features including, but not limited to, data access and searching (e.g., predefined queries, simple queries, advanced searching), categorization, personalization options, data mining, data profiling, etc. Presentation module 230 may also allow users to customize presentations by, for example, setting various parameters. In one embodiment, presentation module 230 may interact with access systems 130 to enable users to view information tracked by monitoring module 210. In addition, presentation module 230 could transmit alerts generated by alert monitor 218 to the access system. Presentation module 230 could also transmit periodic reports to the access systems.

Although FIG. 2 illustrates interaction between presentation module 230 and access systems 130, one or more of monitors 212, 214, 216 and 218 may interact with access systems 130 directly. For example, alert monitor 218 may transmit alerts directly to one or more access systems. In addition, all or part of the functionality of presentation module 230 may be embedded within one or more of the monitors.

Security module 240 may include components for controlling user access to warehouse monitor 120. Security module 240 may include components for performing user authentication and authorization. In one implementation, user authentication may be performed via logon passwords. Other mechanisms for performing user authentication may be employed, however, such as a public key infrastructure (PKI) employing public key cryptography. Different users may be provided varying levels of authorization. Further, certain users may be assigned different rights. Although depicted as part of warehouse monitor 120, all or part of the functionality of security module 240 may reside external to warehouse monitor 120. For example, warehouse management system 110 may control access to warehouse monitor 120 and warehouse monitor 120 may not include its own separate security component.

Figure 3:
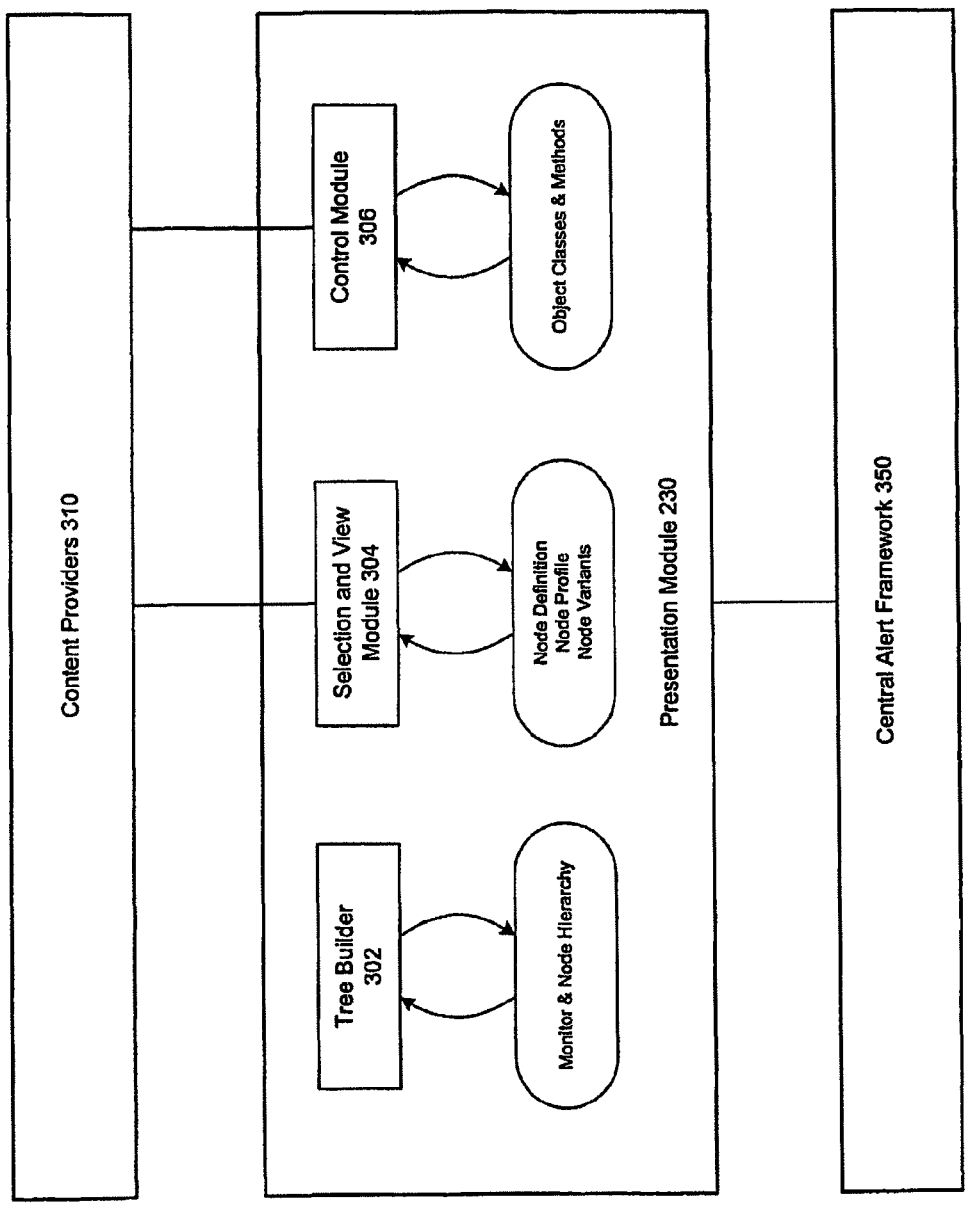
FIG. 3 illustrates an exemplary framework for a presentation module consistent with embodiments of the present invention.

FIG. 3 illustrates an exemplary framework for presentation module 230. As illustrated in FIG. 3, presentation module 230 may include a tree builder 302, a selection and view module 304, and a control module 306.

Tree builder 302 may process information received from monitoring module 210 to generate a hierarchical arrangement (or tree) of nodes for information (data objects, document information, etc.) associated with warehouse 105. A node may be associated with a category and used for logical grouping. For example, a node may be a folder specifying a particular category of object classes. Alternatively, a node may be associated with a profile, which defines node characteristics, such as object class associations (e.g., wave, TO, etc.), functions, etc., and which may differ from other profiles of the same object class by the corresponding node's role and position in the tree. A node associated with a profile may further be associated with at least one selection screen, function, view, object class, or operational method. Thus, when a profile node is associated with a particular function or operation method, for example, the profile node may be associated with a content provider 310 for receiving data to be viewed via the respective node.

Tree builder 302 may generate a tree for one or more of monitors 212 to 218. For example, tree builder 302 may generate a tree for inbound monitor 212, outbound monitor 214, internal monitor 216, and alert monitor 218. Tree builder 302 may also generate a tree of nodes corresponding to monitor module 210 encompassing the inbound, outbound, internal and alert monitors 212 to 218. For each monitor, tree builder 302 may generate a tree according to the object classes associated with the activities tracked by the respective monitor. Tree builder 302 may also allow users to define a new tree by generating user-defined monitors. For example, users may designate different monitors for certain warehouse activities, and tree builder 302 may generate a tree according to the object classes associated with those activities.

Figure 4:
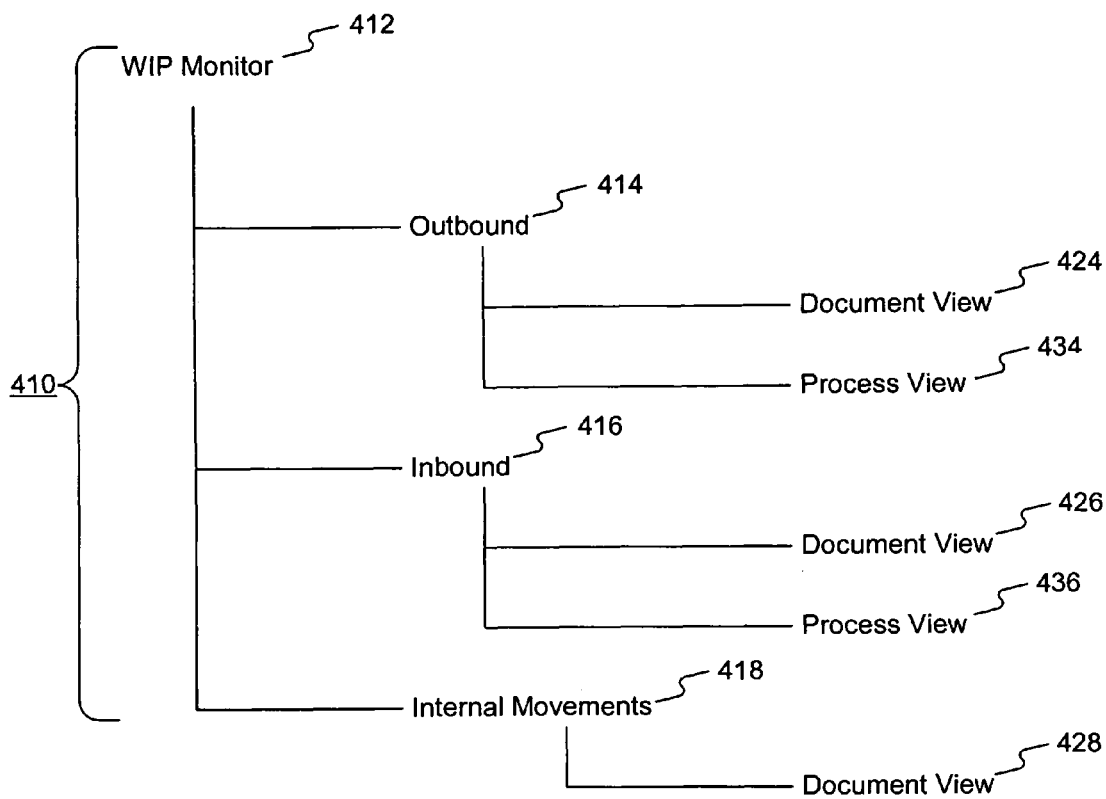
FIG. 4 depicts an exemplary tree structure consistent with embodiments of the present invention.

FIG. 4 depicts an exemplary tree structure 410 that may be generated by tree builder 302. Each node of tree structure 410 may be associated with one or more child nodes and/or one or more documents or data objects. For instance, as illustrated in FIG. 4, tree structure 410 may include a {Monitor} node 412 reflecting a category type, which may further include an {Outbound} node 414, an {Inbound} node 416, and an {Internal} node 418. Each of nodes 414, 416, and 418 in tree structure 410 may be category nodes and may be associated with a {Document View} node (e.g., nodes 424, 426, and 428) and/or a process view node (e.g., nodes 434 and 436). The document nodes may include documents and data objects, as well as their mutual relations. For example, a particular document node could include data objects or documents associated with the following items: waves, wave items, warehouse requests, warehouse orders (bundles), and TOs. The process nodes may include data objects or documents associated with inbound, outbound, and internal process steps, such as picking, packing, staging, loading, unloading, counting, spreading, and putaway operations.

Figure 5A:
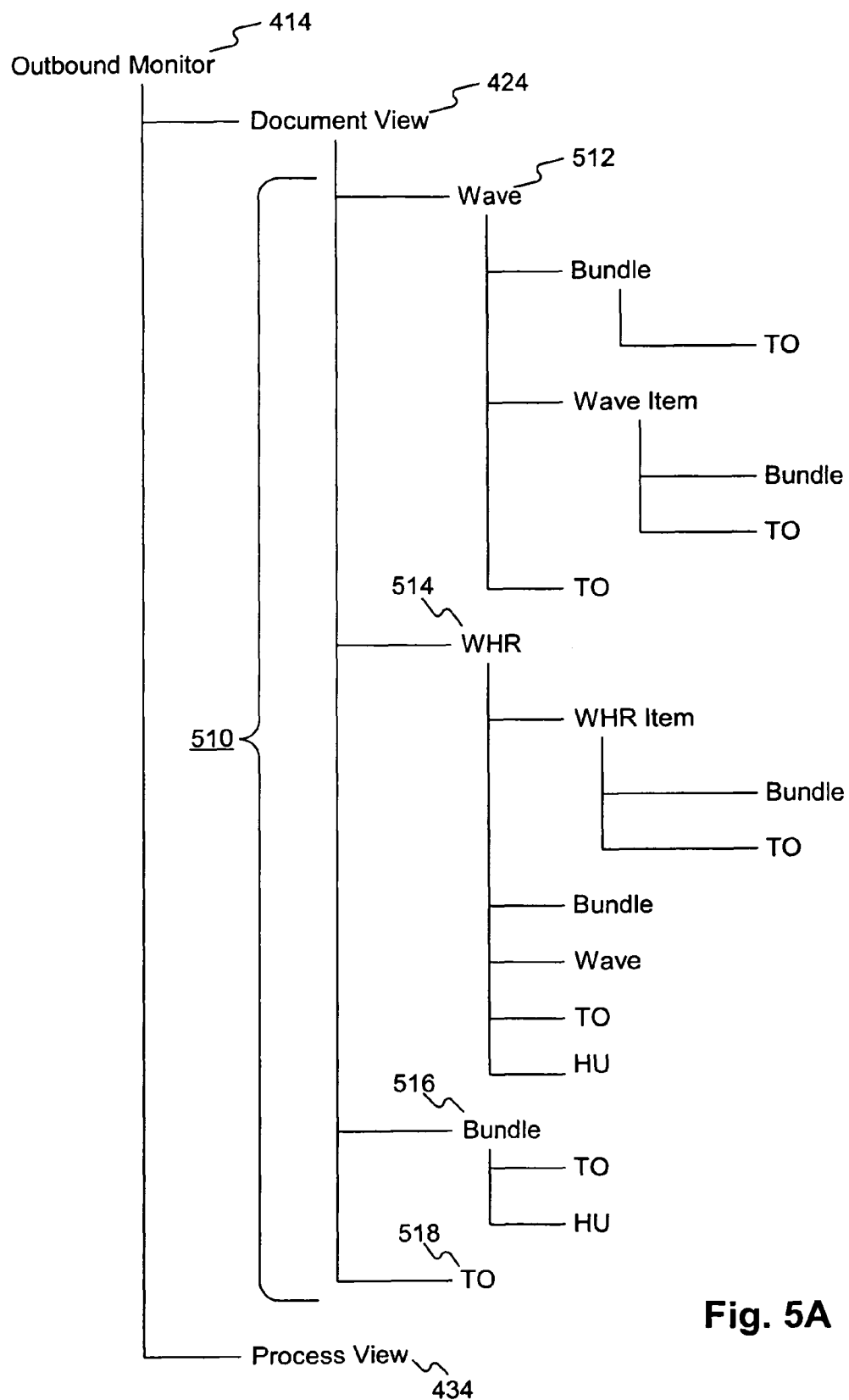
FIGS. 5A-5C depict exemplary tree structures consistent with embodiments of the present invention.
Figure 5B:
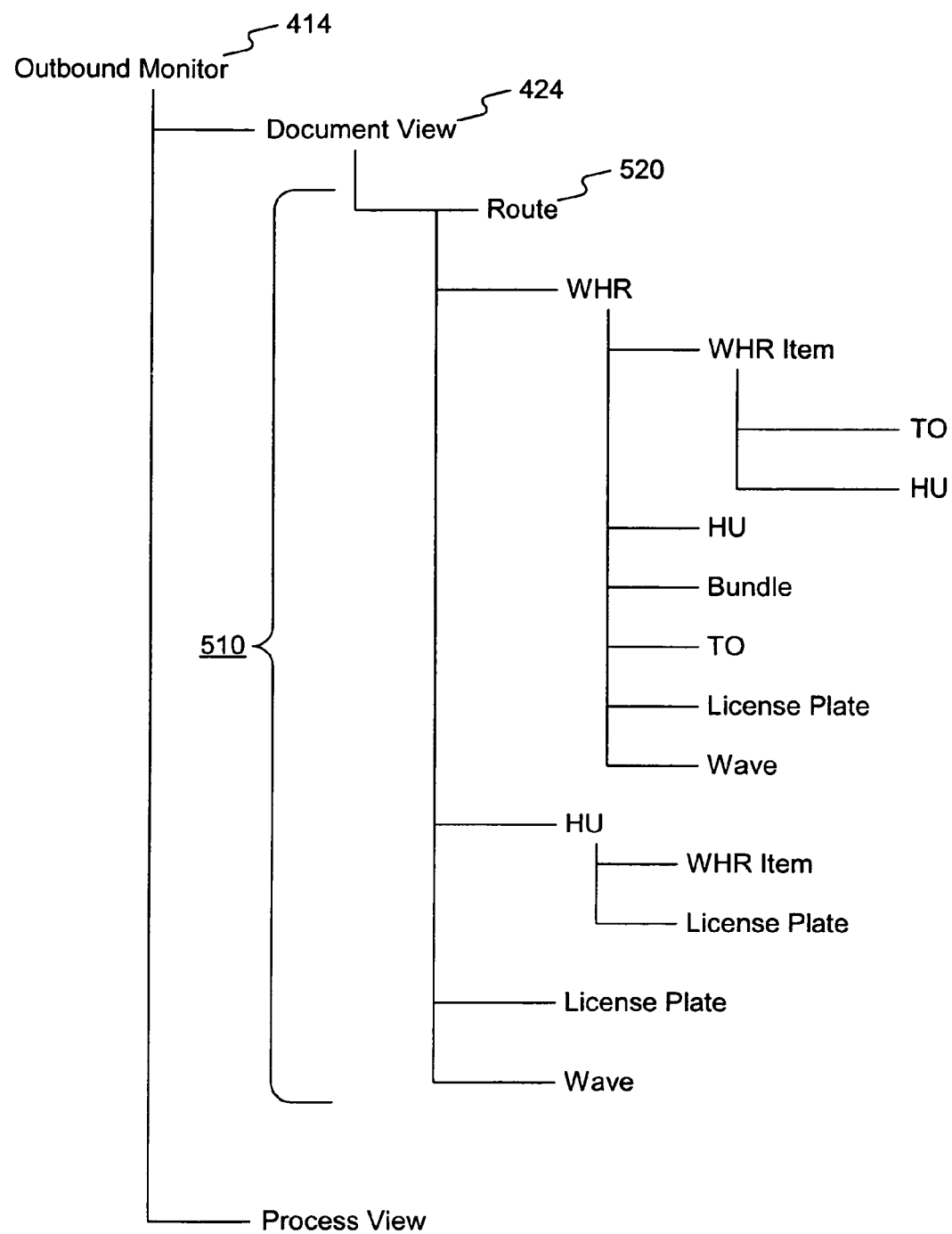

FIGS. 5A and 5B collaboratively illustrate an exemplary tree structure 510 associated {Document View} node 424, which is associated with {Outbound} node 414 of tree structure 410. As illustrated in FIG. 5A, node 424 may include several profile nodes; namely, a {Wave} child node 512, a {Warehouse Request} child node 514, a {Bundle} child node 516, and {TO} child node 518, all of which may represent object classes. As illustrated in FIG. 5B, node 424 may also include a {Route} node 520. Additional and alternative child nodes may exist. Each node may contain documents and data objects associated with the corresponding class; A document class can occur several times and in different positions in a tree, and the interpretation of the documents and objects that are presented for a particular class depends on the position of the class in the tree. For example, as illustrated in FIGS. 5A and 5B, the TO class occurs several times in the tree and in each occurrence it may be associated with different documents.

Figure 5C:
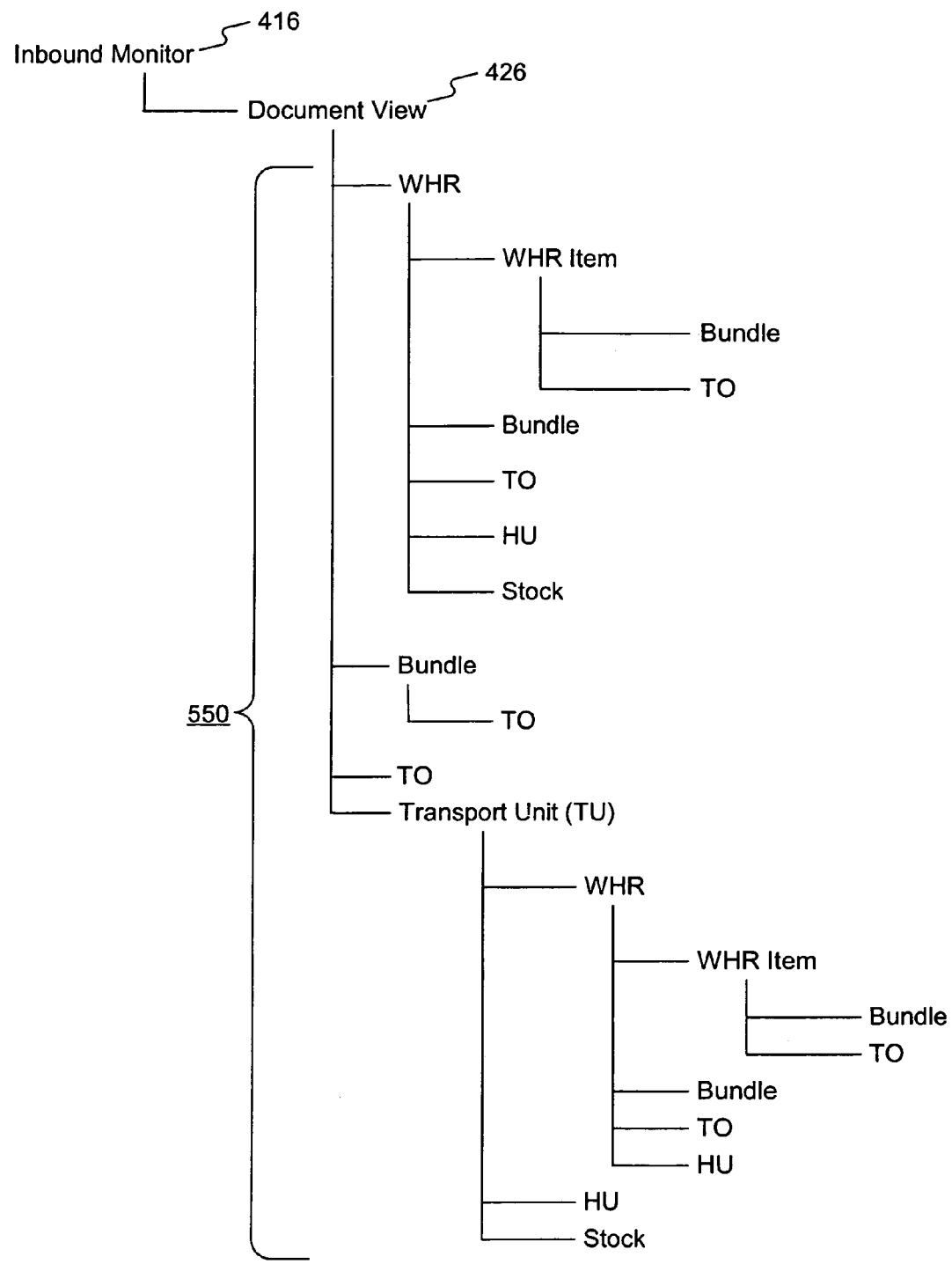

Similar to {Outbound} node 414, the {Inbound} and {Internal} nodes of tree structure 410 may be associated with document nodes, which in turn may include child nodes representing various object classes. The child nodes may, however, differ from those illustrated in FIGS. 5A and 5B. For example, FIG. 5C illustrates an exemplary tree structure 550 associated with document node 426, which is associated with the {Inbound} node 416 of tree structure 410.

Figure 6A:
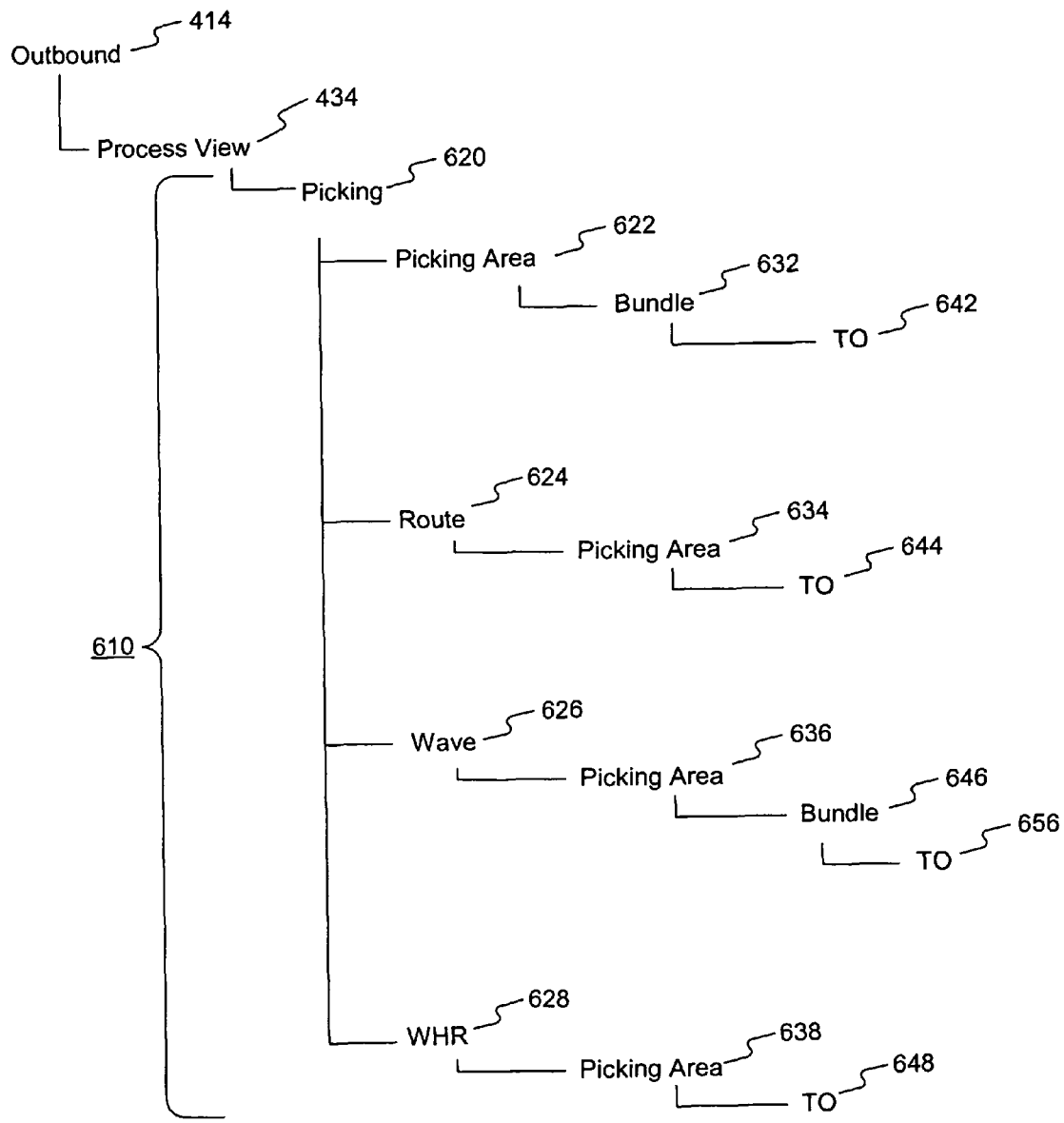
FIGS. 6A-6E depict exemplary tree structures consistent with embodiments of the present invention.

FIG. 6A illustrates an exemplary tree structure 610 associated with {Process View} node 434 associated with the {Outbound} node 414 of tree structure 410. As illustrated, node 434 may include a {Picking} child node 620. Child node 620 may, in turn include, for example, a {Picking Area} child node 622, a {Route} child node 624, a {Wave} child node 626, and a {Warehouse Request} child node 628. The {Picking} node 620 may be associated with information concerning an overview of the picking workload (e.g., number of TOs to pick, number of bundles to pick, etc.) in a given time interval. The {Picking Area} node 622 may be associated with information concerning an overview of the workload for various picking areas. The {Route} node 624 may include information concerning the picking workload in a given time frame for a specified route. The {Wave} node 626 may be associated with the picking workload for a specified wave, and the {Warehouse Request} node 628 may be associated with the picking workload for a specific warehouse request. As illustrated, each of nodes 622, 624, 626, and 628 may include additional child nodes (632, 634, 636, 638), grandchild nodes (642, 644, 646, 648), and great grandchild nodes (e.g. 656).

Figure 6B:
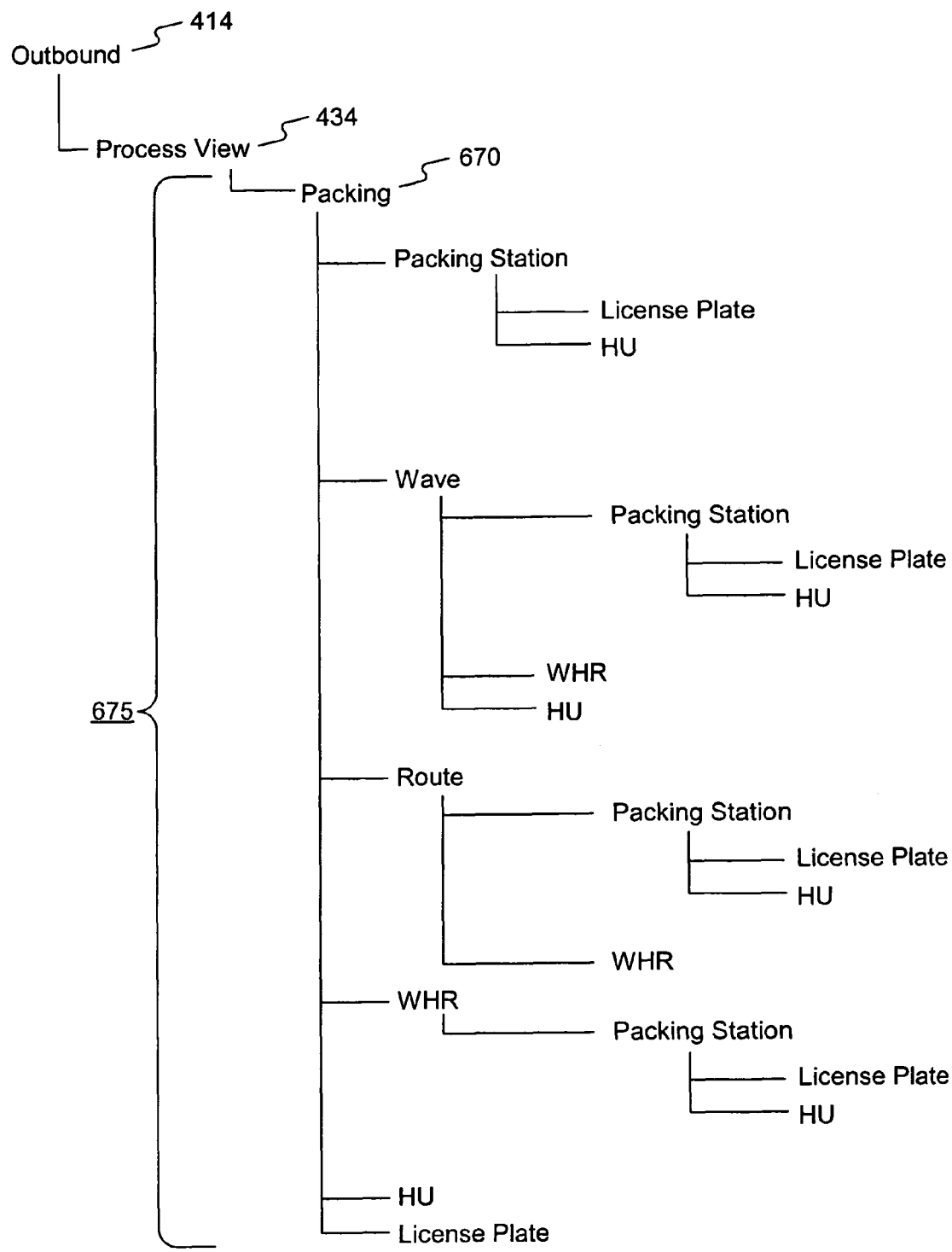
Figure 6C:
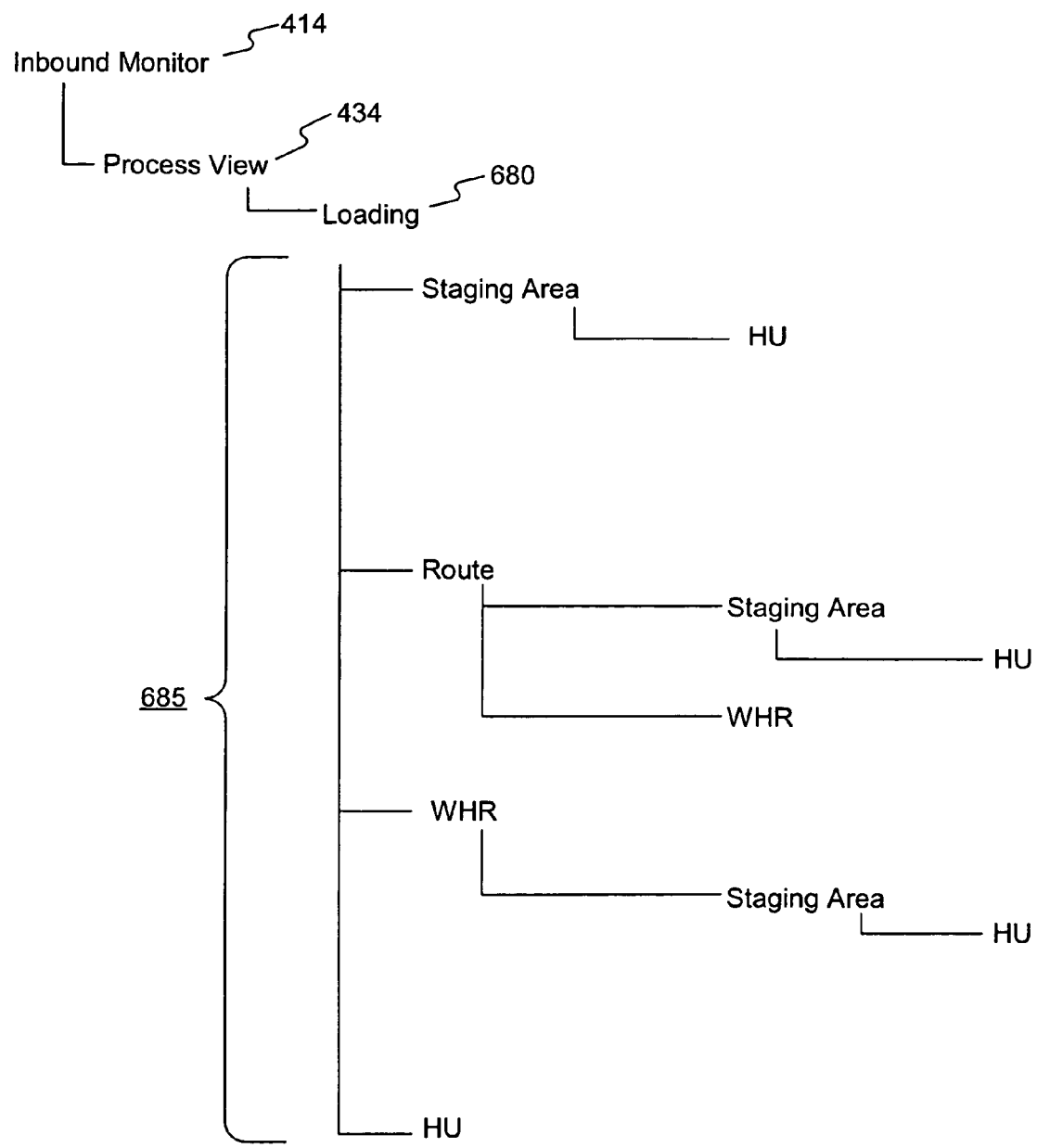

{Process View} node 434 may be associated with other child nodes in addition to {Picking} node 620, such as a {Packing} node and a {Loading} node. For example, FIGS. 6B and 6C, respectively, illustrate exemplary tree structures 675 and 685 associated with a {Packing} node 670 and a {Loading} node 680.

Figure 6D:
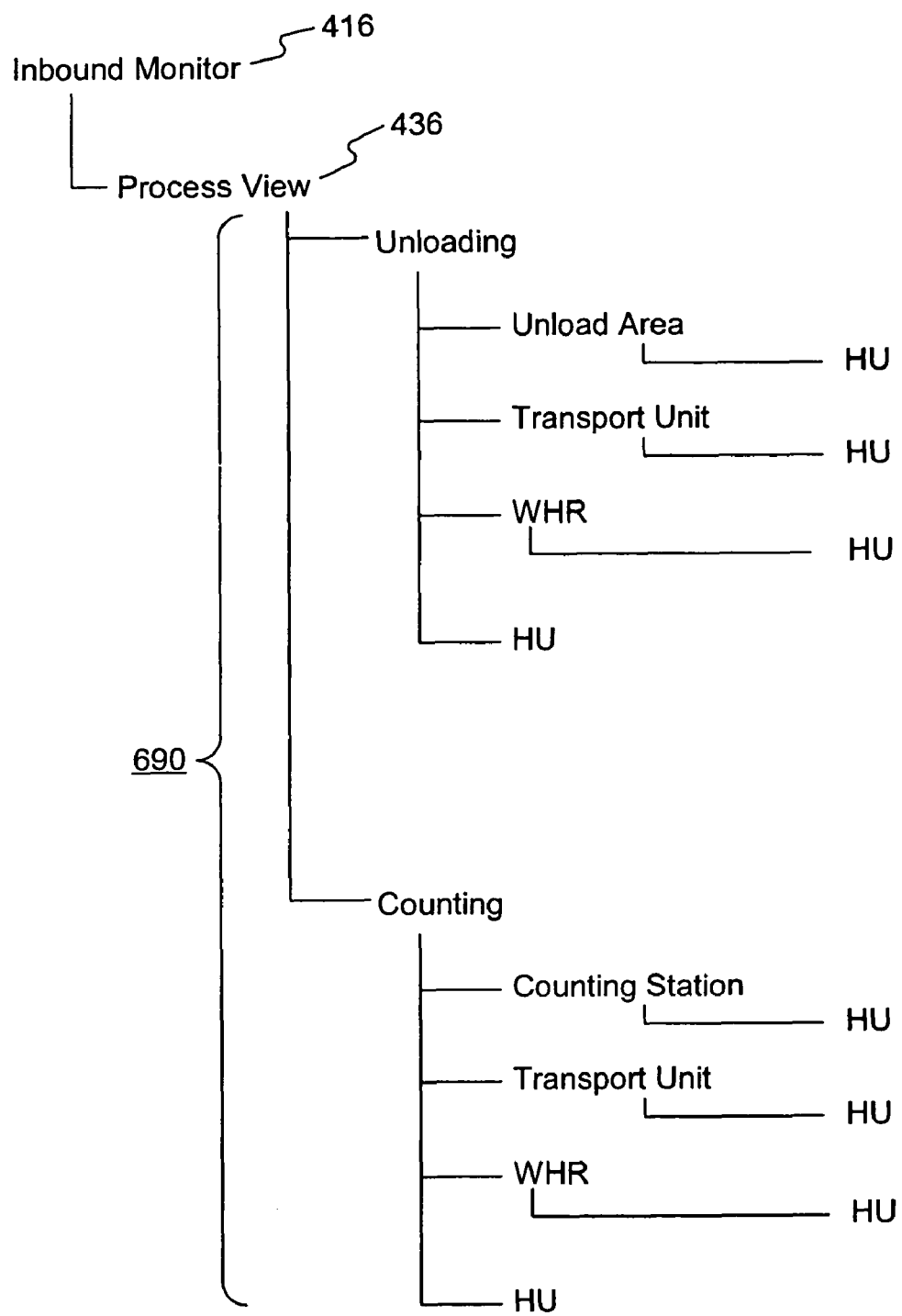
Figure 6E:
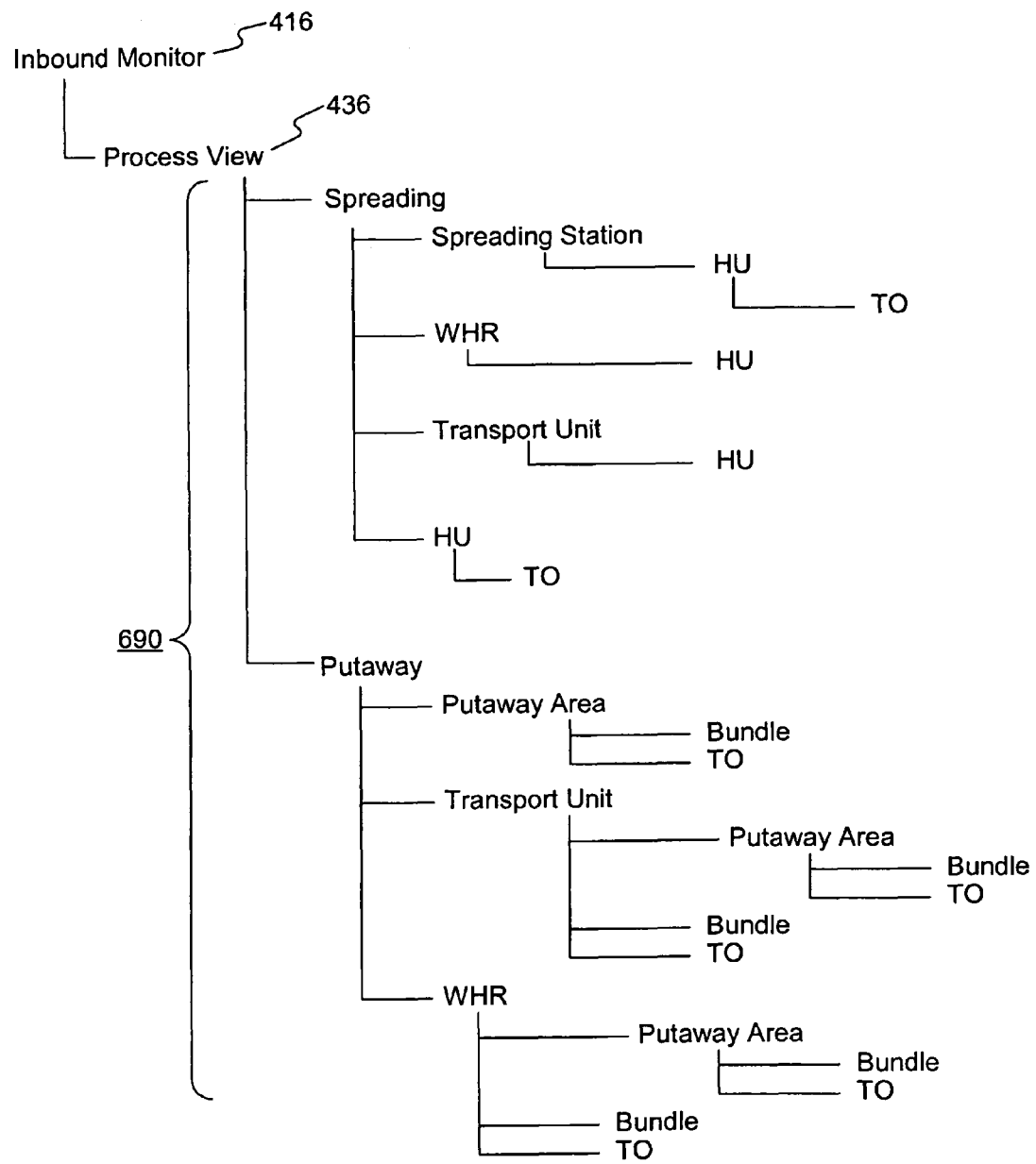

Similar to {Outbound} node 414, the {Inbound} and {Internal} nodes of tree structure 410 may be associated with {Process View} nodes, which in turn may include child nodes representing various object classes. FIGS. 6D and 6E collectively illustrate an exemplary tree structure 690 associated with {Process View} node 436, which, in turn, is associated with the {Inbound} node 416 of tree structure 410.

Referring back to FIG. 3, selection and view module 304 may generate various interfaces, displays, and selection screens, and it may manage various information views. Selection and view module 304 may include, leverage, and/or interact with one or more design time environments that create browser-based user interfaces and one or more standards-based run-time environments. For example, as described above, warehouse management system 110 may include an enterprise software application. Selection and view module 304 may interact with the enterprise application. Selection and view module 304 may display trees generated by tree builder 302. In one embodiment, selection and view module 304 may present, for each node in a displayed tree, a "list" view and a "form" view. The list view may include a grid-type view of node information and may provide sorting, filtering, and printing functionalities for each node. The form view provides a focused view over each selected node. The form view may present object details and may be implemented as an interface screen of the enterprise application.

Figure 7:
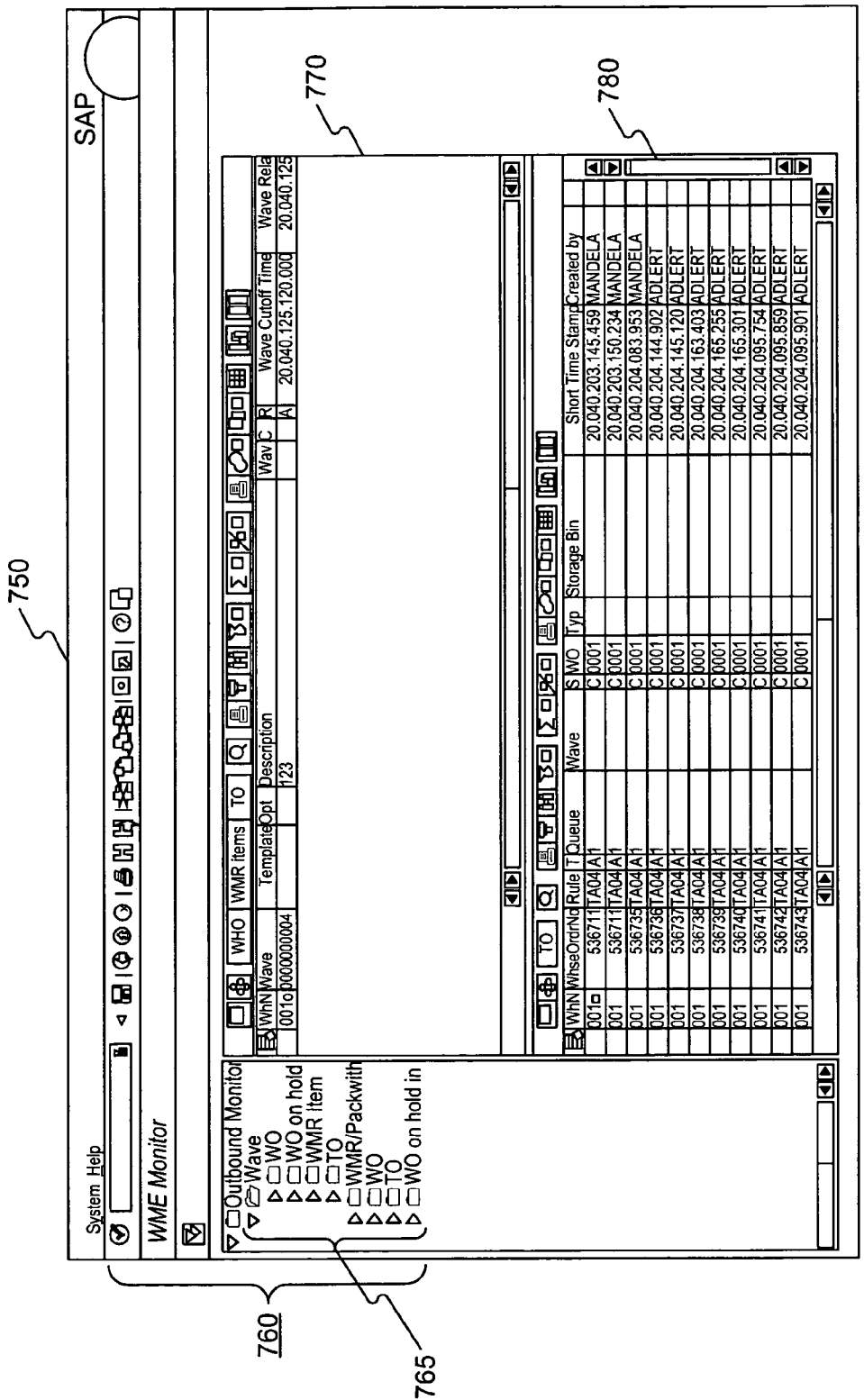
FIG. 7 illustrates an exemplary screen shot of a display consistent with embodiments of the present invention.

FIG. 7 illustrates an exemplary screen shot of a display 750 that may be generated by selection and view module 304. As illustrated, display 750 may include a hierarchical tree 760 (generated by tree builder 302, which may be associated with an outbound monitor. Tree 760 may include a plurality of nodes 765 that represent the various object classes managed by the relevant monitor, in this case the outbound monitor. Tree 760 may be used for navigation purposes only, and may not include any data objects associated with its nodes.

To navigate between nodes, selection and view module 304 may present, for each node in tree 760, a list view or form view of that node. In addition, as illustrated in FIG. 7, display 750 may include a parent view 770 and a child view 780. Parent view 770 may display the list or form view of a selected node, and child view 780 may present the list or form view of one or more child nodes of that selected node. For example, as illustrated in FIG. 7, parent view 770 may present a list view of the wave node in tree 760 and child view 780 may present the child nodes of the parent node (e.g., the warehouse orders corresponding to the parent wave node. It should noted that a selected parent node may, however, be a child node of another node. The parent and child view areas of display 750 may allow users to utilize methods to perform actions on objects; utilize sorting, filtering, printing, and other options; refresh the view; view accumulated selection criteria from the root to the selected node; and toggle between from and list views.

Navigation to and between nodes can be accomplished from tree 760, by selecting a node or using a selection criteria node context menu item. Objects may be presented in the parent view area. Navigation can also be accomplished from an objects view (form or list view by, for example, selecting from a toolbar a menu item presenting a corresponding child node. Presentation module 230 may build toolbar navigation options for each object according to the set of corresponding child nodes. If navigation is performed from the parent view, child objects may be presented in the child view area. If navigation is performed from the child view, the current parent view may be replaced by the current child view and grandchild objects may be presented in the child area.

In one embodiment, selection and view module 304 may allow users to modify trees, generate new trees or nodes, generate user-defined views for specific object classes in the hierarchy, and to navigate between nodes of a tree. The particular selection and modification options may depend on the particular object class and its position in the hierarchy. For example, selection options previously used on the parent node can be automatically provided by selection and view module 304. Further, display 750 may also present toolbar menu options based on the child nodes corresponding to a node selected by the user. Further, in one embodiment, selection and view module 304 may allow users to maintain variants. A "variant" may be a data object containing sets of ranges for pre-defined selection criteria. A variant may also, or alternatively, maintain user-defined layouts for list views. Variants may be generated, with or without nodes, for a specific object class. Variants may be named by users and stored in one or more tables in repository 220 with a unique identifier generated by selection and view module 304. Data repository 220 may include one or more tables for translating between defined and displayed variants. Selection and view module 304 may allow users to maintain variants at the child (same node profile) level or at the root (node category) level. At the child level, only the selection criteria of the selected node are maintained.

Variants may be used in several ways. For example, variants may be used as selection criteria for a selected node. For instance, the same node profile can be used in different nodes differentiated by a variant including selection criteria and/or a list view layout. Variants may also be presented in newly created nodes, known as variant nodes. Variant nodes may be used to differentiate different nodes. A variant node may be created by a user and based on an existing node. A variant node may be generated at the same level as an existing node or at the category level. Accordingly, selection and view module 304 may thus provide the following options for a profile node: set selection criteria, hide the node when viewing the tree, create a variant node for the current tree level; or create a variant node for the node's category level.

Selection and view module 304 may manage and facilitate selection of node options. Each node in a generated tree may be associated with a function module, which may fetch data for the node profile and enable focused view of the object represented by the node. When a user selects a node, selection and view module 304 may present a selection screen associated with the function module. The selection screen of a particular node may include all of the options associated with that node as well as options associated with nodes higher up in the hierarchy. Tree builder 302 may automatically pass the accumulated options to the function module of a selected node. The selection criteria for each node may be set manually or by selecting an existing variant.

Figure 8A:
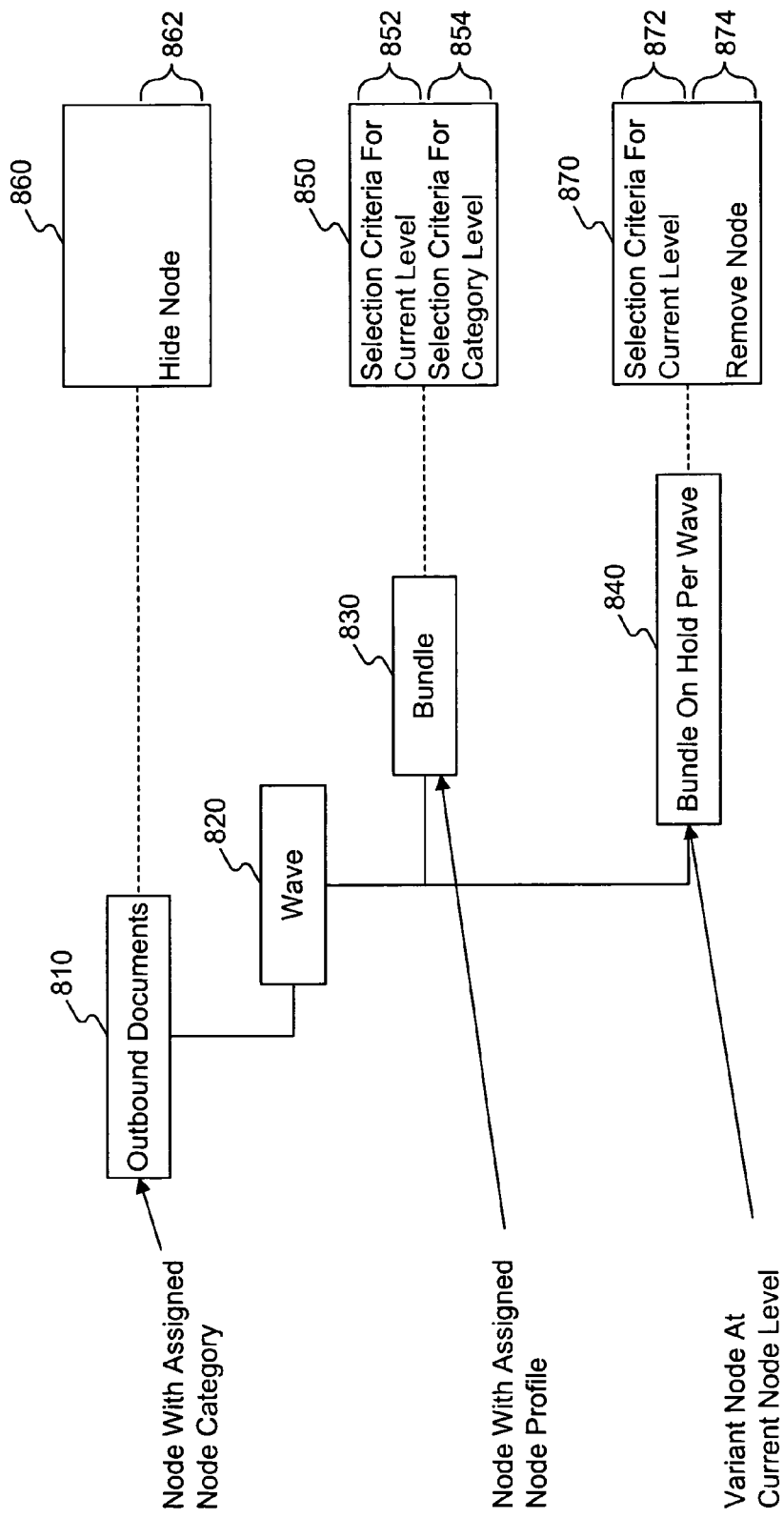

FIGS. 8A and 8B illustrate aspects of managing and selecting node options. FIG. 8A depicts an {Outbound Documents} node 810 that is assigned to a category, a {Wave} child node 820, a {Bundle} grandchild node 830 with an assigned node profile, and a {Bundle on hold per wave} variant node 840 at the same level as node 830. For each node, selection and view module 304 may present a context menu that displays various options, such as {Selection criteria for current level}, {Selection criteria for category level}, {Remove node}, {Hide node}, and {Generate variant node}. Different options may be presented for each node, depending on its status in the hierarchy. For example, if a user selects {Bundle} node 830, selection and view module 304 may present a context menu 850 that displays a {Selection criteria for current level} context item 852, and a {Selection criteria for category level} context item 854. For node 810, selection and view module 304 may present a context menu 860 that presents only a {Hide node} context item 862. For variant node 840, selection and view module 304 may present a context menu 870 that presents a {Selection criteria for current level} context item 872, and a {Remove node} context item 874. Each context item in of context menus 850, 860, and 870 may be associated with a corresponding selection screen display that allows a user to select one or more options. Non-limiting examples of such options include: save variants at the node profile level; save variants at the category level; set variants as a default for the selected node; obtain generated variants at the node profile level; use the selection criteria or selected variant; generate a variant node at the current node's level; generate a variant node as a child of the corresponding node category; check the entries; display selection criteria by ranges or single values; select new fields for the selection screen; hide fields in the selection screen; and exit selection criteria and return to the tree. For example, FIG. 8B depicts an exemplary screen shot 895 of a selection screen that may be associated with a particular context item.

In certain embodiments, selection and view module 304 may address various content providers 310 in order to effect actions associated with a user selection (e.g., node selections). In systems consistent with the invention, a content provider 310 may include any application or system that provides information or performs actions on data objects associated with warehouse 105. Content providers 310 may include applications and systems tasked with executing warehouse activities. For example, content providers 310 could include automated loading and packing systems. Content providers 310 may include systems within warehouse management system 110, as well as requestors 140, and other business logic systems associated with enterprise 150.

Control module 306 may manage object classes and methods associated with nodes. Presentation module 230 may display methods in the toolbars of the object views (list or form view). Methods may be assigned to object classes and may include actions that are carried out on specified objects associated with the assigned object class. The methods enable users to manage and control warehouse activities from warehouse monitor 120. Methods may be implemented using function modules, which may be provided by the content providers responsible for the required object class. Control module 306 may address specific methods to corresponding function modules (content providers) passing selected objects.

Figure 9:
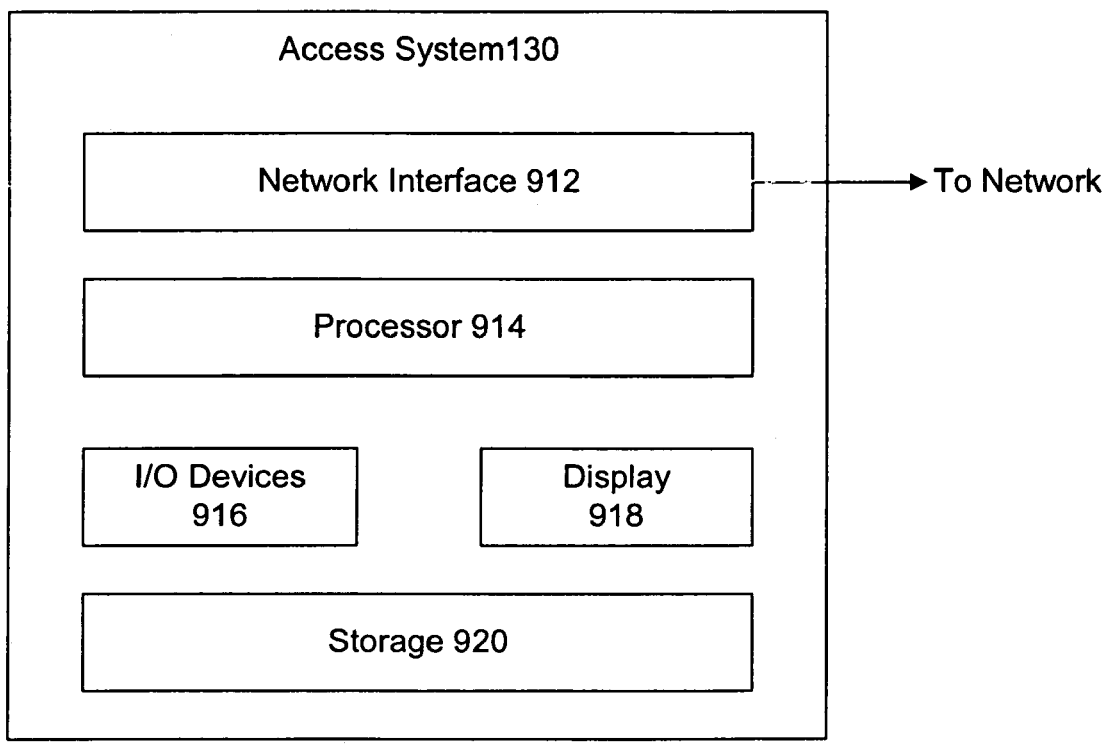
FIG. 9 is a block diagram of an exemplary access system consistent with embodiments of the present invention.

As described above, presentation module 230 may use tree builder 302, selection and view module 304, and control module 306 to present information to users via access systems 130. FIG. 9 illustrates an exemplary access system 130 consistent with the present invention. As illustrated, access system 130 may comprise a network interface 912, a processor 914, I/O devices 916, a display 918, and a storage 920. A system bus (not illustrated) may interconnect such components. The illustrated components are exemplary only, and access system 130 may comprise additional and/or fewer components.

Network interface 912 may be any appropriate mechanism and/or module for facilitating communication with a network, such as the Internet, a virtual private network, a local area network, a wide area network, a broadband digital network or any other appropriate structure for enabling communication between two or more nodes or locations. Network interface 912 may include one or more network cards and/or data and communication ports.

Processor 914 may be configured for routing information among components and devices and for executing instructions from one or more memories. Although FIG. 9 illustrates a single processor, access system 130 may include a, plurality of general-purpose processors and/or special purpose processors (e.g., ASICS). Processor 914 may be implemented, for example, using a Pentium™ processor provided from Intel Corporation.

I/O devices 916 may include components such as keyboard, a mouse, a pointing device, and/or a touch screen. I/O devices 916 may also include audio or video-capture devices. In addition, I/O devices 916 may include one or more data reading devices and/or input ports.

Access system 130 may present information and interfaces (e.g., graphical user interfaces or GUIs) via display 918, such as the exemplary interface screens described above in connection with FIGS. 4 to 8. Display 918 may be configured to display text, images, or any other type of information. In certain configurations, display 918 may present information by way of a cathode ray tube, liquid crystal, light-emitting diode, gas plasma, or other type of display mechanism. Display 918 may additionally or alternatively be configured to audibly present information. Display 918 may be used in conjunction with I/O devices 912 for facilitating user interaction with access system 130.

In exemplary embodiments, access system 130 may present a node such that its type may be distinguished based on a graphical component identifying that node. For example, different display or GUI icons can be used for different types of nodes. The tree may thus display category nodes, profile nodes, and variant nodes by using a respective icon associated with each type of node.

Storage 920 may provide mass storage and/or cache memory for access system 130. Storage 920 may be implemented using a variety of suitable components or subsystems. Storage 920 may include a random access memory, a read-only memory, magnetic and optical storage elements, organic storage elements, audio disks, and video disks. In certain configurations, storage 920 may include or leverage one or more programmable, erasable and/or re-useable storage components, such as EPROM (erasable programmable read-only memory) and EEPROM (erasable programmable read-only memory). Storage 920 may also include or leverage constantly-powered nonvolatile memory operable to be erased and programmed in blocks, such as flash memory (i.e., flash RAM). Although a single storage module is shown, any number of modules may be included in access system 130, and each may be configured for performing distinct functions.

Storage 920 may include program code for various applications, an operating system, an application-programming interface, application routines, and/or other executable instructions. Storage 920 may also include program code and information for communications (e.g., TCP/IP communications), kernel and device drivers, and configuration information. In one example, one or more applications that enable users to interact with warehouse management system 110 may be implemented in storage 920.

For purposes of explanation only, aspects of warehouse monitor 120 are described with reference to the discrete functional modules, sub-modules, and elements illustrated in FIGS. 2, 3, and 9. The functionality of the illustrated elements, modules, and sub-modules, however, may overlap and/or may exist in a fewer or greater number of elements, modules, and/or sub-modules. Moreover, all or part of the functionality of the illustrated components may co-exist or be distributed among several geographically-dispersed locations.

Figure 10:
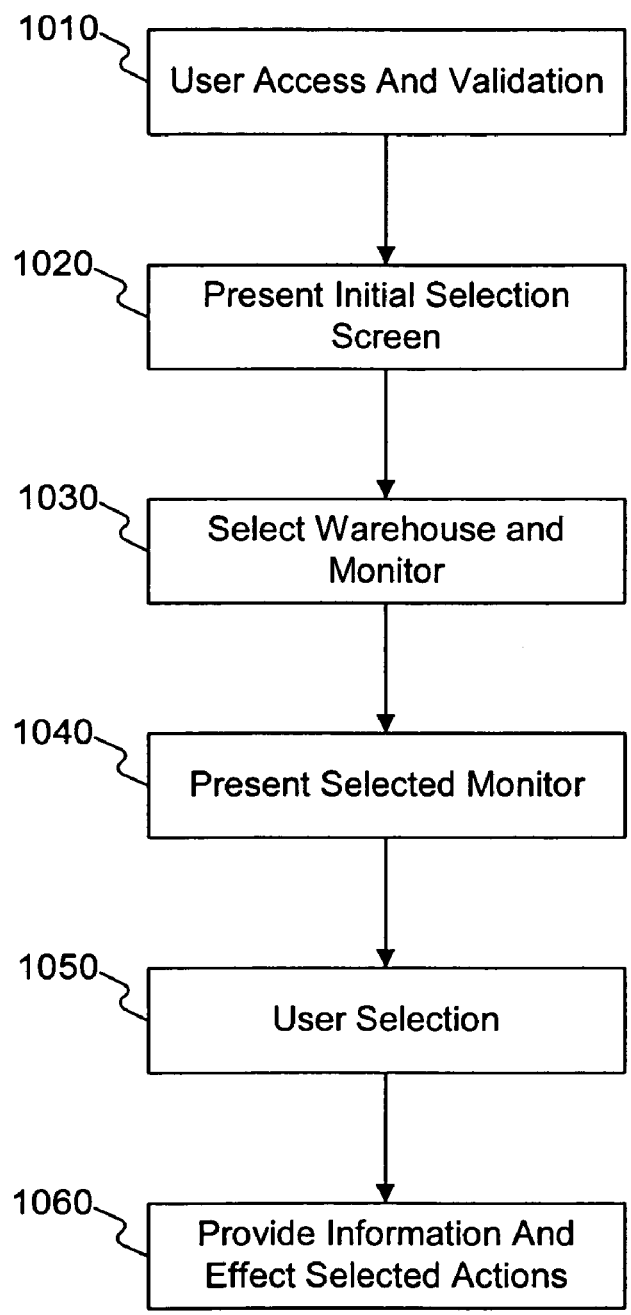
FIG. 10 is a flow diagram depicting an exemplary warehouse monitoring process consistent with embodiments of the present invention.

FIG. 10 is a flowchart depicting an exemplary warehouse monitoring method 1000 consistent with the present invention. Method 1000 may begin with user access and validation (step 1010). In one example, a user associated with enterprise 150 may access, and initiate a session with, warehouse monitor 110 via access system 130. In alternative embodiments, the user may access and initiate a session with warehouse monitor 110 directly without access system 130. Warehouse monitor 110 may provide a login screen for display on access system 130, and the user may input identification information (e.g., a username and password) to access system 130. Access system 130 may transmit (directly or via a network) the identification information to warehouse monitor 110, and security module 240 may perform authentication and validation processes. Security module 240 may determine the level of access the particular user should be granted, based on the identification information.

Figure 11:
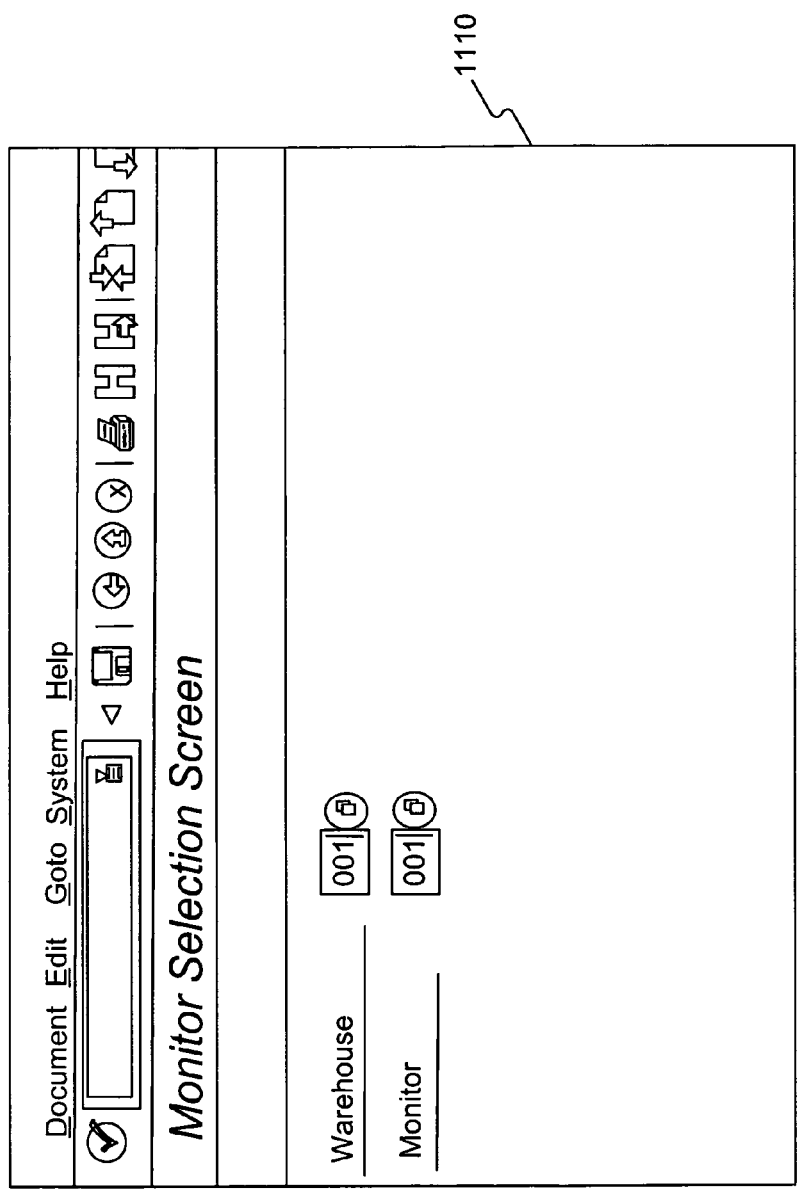
FIG. 11 is an exemplary screen shot of an exemplary selection screen consistent with embodiments of the present invention.

After the user is authenticated and validated, warehouse monitor 120 may present a selection screen to the user (step 1020). An exemplary selection screen 1110 is illustrated in FIG. 11. The selection screen may be presented via access system 130. Upon viewing the selection screen, the user may specify or select a particular warehouse and monitor, such as one of monitors 212, 214, 216, and 218 (step 1030). For example, the user can choose a specific warehouse associated with enterprise 150 and may choose to view the inbound monitor 212 associated with that warehouse.

Upon receiving the user's selection, warehouse monitor 120 may present to the user the selected monitor (step 1040), which may be presented via access system 130. In one embodiment, warehouse monitor 120 could be pre-configured to display one or more monitors for specific warehouses. Users may therefore be routed to those monitors automatically upon selecting a particular warehouse. In addition, warehouse monitor 120 could be configured to default to a main monitor, which could encompass the inbound monitor 212, outbound monitor 214, internal monitor 216, and alert monitor 218, in the event the user does not select a monitor.

At this point, the user may input selections to warehouse monitor 120 (step 1050), in order to view warehouse activities, monitor workloads, and/or effect actions in the warehouse. Users may input selections by selecting nodes from a displayed hierarchical tree generated by tree builder 302 and displayed by selection and view module 304. In response to user selections, warehouse monitor 120 may present to the user the requested information and effect selected actions (step 1060). This may involve displaying documents and data objects, invoking methods associated with nodes, and addressing methods to various content providers.

FIG. 10 is consistent with exemplary implementations of the present invention. The sequence of events described in FIG. 10 is exemplary and not intended to be limiting. Other steps may therefore be used, and even with the method depicted in FIG. 10, the particular order of events may vary without departing from the scope of the present invention. Further, the illustrated steps and functionality may overlap and/or may exist in fewer steps. Moreover, certain steps may not be present and additional steps may be implemented in the illustrated method. In addition, the illustrated steps may be modified without departing from the scope of the present invention.

The foregoing description of possible implementations consistent with the present invention does not represent a comprehensive list of all such implementations or all variations of the implementations described. The description of only some implementations should not be construed as an intent to exclude other implementations. Artisans will understand how to implement the invention in the appended claims in many other ways, using equivalents and alternatives that do not depart from the scope of the following claims.

What is claimed is:

1. A computer-implemented method for monitoring warehouse activities, comprising the steps performed by a computer of:

receiving inbound information reflecting the status of wares destined for storage in a warehouse;

receiving internal information reflecting movement of the wares within the warehouse;

receiving outbound information reflecting outbound processing of the wares;

organizing the storage of the inbound, internal, and outbound information into a hierarchical tree of nodes, in which a parent node corresponds to one of the inbound information, the internal information, or the outbound information and first and second child nodes associated with the parent node correspond respectively to a document view and a process view, wherein:

the document view includes information about documents associated with the inbound information, the outbound information, and the internal information, and the process view includes information about process steps associated with the inbound information, the outbound information, and the internal information;

presenting the hierarchical tree to a user;

receiving at least one instruction from the user selecting at least one of the nodes in the hierarchical tree, the at least one instruction including the selection of a data object in accordance with the document view or the process view; and displaying each data object corresponding to the selected node, wherein presenting comprises displaying, for each one node, a context menu containing different options, wherein the different options differ according to a location level of the one node within the hierarchical tree of nodes, and wherein the hierarchical tree of nodes comprises a profile node, which includes a data object corresponding to at least one of a selection screen, function, view, object class, or operational method; and a variant node, which includes an existing profile node, wherein a selection criteria or a list view layout of the existing profile node is varied based on a location of the variant node within the hierarchical tree.

2. The method of claim 1, wherein providing inbound information comprises providing at least one data object associated with at least one of an unloading process, a spreading process, a packaging process, a putaway process, an inspection process, a counting process, a testing process, and an order processing.

3. The method of claim 1, wherein providing inbound information comprises providing information reflecting at least one of a wave, a warehouse request, a warehouse order, and a transfer order.

4. The method of claim 1, wherein providing internal information comprises providing at least one data object associated with at least one of a replenishment process, a scrapping process, and a re-arrangement process.

5. The method of claim 1, wherein providing outbound information comprises providing at least one data object associated with at least one of a picking process, a packing process, a staging process, and a loading process.

6. The method of claim 1, wherein presenting the hierarchical tree to the user further comprises presenting, for a selected time period, at least one workload of the warehouse calculated using at least one of the inbound information, the internal information, and the outbound information.

7. The method of claim 1, further comprising:
monitoring alert information reflecting problematic processes in the warehouse; and
generating an alert when at least a portion of the alert information exceeds a predetermined threshold.

8. A system for monitoring warehouse activities, the system comprising:
a storage unit for storing software programs, the software programs comprising:
an inbound monitor that monitors inbound information reflecting the status of wares destined for storage in a warehouse;
an internal monitor that monitors internal information reflecting movement of the wares within the warehouse;
an outbound monitor that monitors outbound information reflecting outbound processing of the wares; and
a presentation module that organizes the inbound, internal, and outbound information into a hierarchical tree of nodes, in which a parent node corresponds to one of the inbound information, the internal information, or the outbound information and first and second child nodes associated with the parent node correspond respectively to a document view and a process view,
wherein the document view includes information about documents associated with the inbound information, the outbound information, and the internal information, and
the process view includes information about process steps associated with the inbound information, the outbound information, and the internal information, presents the hierarchical tree to a user, receives at least one instruction from the user selecting at least one of the nodes in the hierarchical tree, the at least one instruction including the selection of a data object in accordance with the document view or the process view, and displays each data object corresponding to the selected node; and
a processor unit for executing the software programs,
wherein presenting comprises displaying, for each one node, a context menu containing different options, wherein the different options differ according to a location level of the one node within the hierarchical tree of nodes, and
wherein the hierarchical tree of nodes comprises a profile node, which includes a data object corresponding to at least one of a selection screen, function, view, object class, or operational method; and a variant node, which includes an existing profile node, wherein a selection criteria or a list view layout of the existing profile node is varied based on a location of the variant node within the hierarchical tree.

9. The system of claim 8, wherein the inbound information includes at least one data object associated with at least one of an unloading process, a spreading process, a packaging process, a putaway process, an inspection process, a counting process, a testing process, and an order processing.

10. The system of claim 8, wherein the inbound information includes information reflecting at least one of a wave, a warehouse request, a warehouse order, and a transfer order.

11. The system of claim 8, wherein the internal information includes at least one data object associated with at least one of a replenishment process, a scrapping process, and a re-arrangement process.

12. The system of claim 8, wherein the outbound information includes at least one data object associated with at least one of a picking process, a packing process, a staging process, and a loading process.

13. The system of claim 8, wherein presentation module presents the status of the warehouse by presenting, for a selected time period, at least one workload of the warehouse calculated using at least one of the inbound information, the internal information, and the outbound information.

14. The system of claim 8, further comprising an alert monitor that monitors alert information reflecting problematic processes in the warehouse and generates an alert when at least a portion of the alert information exceeds a predetermined threshold.

15. The system of claim 8, further comprising a data repository storing the inbound information, the internal information, and the outbound information.

16. A computer-readable medium containing instructions for controlling a computer system to perform a method, the computer system having a processor for executing the instructions, the method comprising:
receiving inbound information reflecting the status of wares destined for storage in a warehouse;
receiving internal information reflecting movement of the wares within the warehouse;
receiving outbound information reflecting outbound processing of the wares;
organizing the storage of the inbound, internal, and outbound information into a hierarchical tree of nodes, in which a parent node corresponds to one of the inbound information, the internal information, or the outbound information and first and second child nodes associated with the parent node correspond respectively to a document view and a process view;
wherein:
the document view includes information about documents associated with the inbound information, the outbound information, and the internal information; and
the process view includes information about process steps associated with the inbound information, the outbound information, and the internal information;
presenting the hierarchical tree to a user;
receiving at least one instruction from the user selecting one of the nodes in the hierarchical tree, the at least one instruction including the selection of a data object in accordance with the document view or the process view; and
displaying each data object corresponding to the selected node,
wherein presenting comprises displaying, for each one node, a context menu containing different options, wherein the different options differ according to a location level of the one node within the hierarchical tree of nodes, and wherein the hierarchical tree of nodes comprises a profile node, which includes a data object corresponding to at least one of a selection screen, function, view, object class, or operational method; and a variant node, which includes an existing profile node, wherein a selection criteria or a list view layout of the existing profile node is varied based on a location of the variant node within the hierarchical tree.

17. The method of claim 1, wherein the nodes of the document view include data objects corresponding to warehouse requests, warehouse orders, and transfer orders and wherein the nodes of the process view include data objects corresponding to process steps for the processing of wares associated with inbound warehouse activities, outbound warehouse activities, and internal warehouse activities.

18. The method of claim 1, wherein organizing further comprises locating the nodes of the different categories on a higher level within the hierarchical tree of nodes than the profile node and the variant node, and locating the profile node and the variant node on the same level within the hierarchical tree of nodes.

19. A computer-implemented method for monitoring warehouse activities, comprising the steps performed by a computer of:
receiving inbound information reflecting the status of wares destined for storage in a warehouse;
receiving internal information reflecting movement of the wares within the warehouse;
receiving outbound information reflecting outbound processing of the wares;
organizing the storage of the inbound, internal, and outbound information into a hierarchical tree of nodes, in which a parent node corresponds to one of the inbound information, the internal information, or the outbound information and first and second child nodes associated with the parent node correspond respectively to a document view and a process view,
wherein the document view includes information about documents associated with the inbound information, the outbound information, and the internal information, and the process view includes information about process steps associated with the inbound information, the outbound information, and the internal information;
presenting the hierarchical tree to a user;
receiving at least one instruction from the user selecting at least one of the nodes in the hierarchical tree, the at least one instruction including the selection of a data object in accordance with the document view or the process view; and
displaying each data object corresponding to the selected node,
wherein organizing comprises locating the nodes of the different categories on a higher level within the hierarchical tree of nodes than the profile node and the variant node, and locating the profile node and the variant node on the same level within the hierarchical tree of nodes, and
wherein presenting further comprises displaying, for each one node, a context menu containing different options, wherein the different options differ according to a location level of the one node within the hierarchical tree of nodes.

20. A computer-implemented method for monitoring warehouse activities, comprising the steps performed by a computer of:
receiving inbound information reflecting the status of wares destined for storage in a warehouse;
receiving internal information reflecting movement of the wares within the warehouse;
receiving outbound information reflecting outbound processing of the wares;
organizing the storage of the inbound, internal, and outbound information into a hierarchical tree of nodes, in which a parent node corresponds to one of the inbound information, the internal information, or the outbound information and first and second child nodes associated with the parent node correspond respectively to a document view and a process view,
wherein the document view includes information about documents associated with the inbound information, the outbound information, and the internal information, and the process view includes information about process steps associated with the inbound information, the outbound information, and the internal information;
presenting the hierarchical tree to a user;
receiving at least one instruction from the user selecting at least one of the nodes in the hierarchical tree, the at least one instruction including the selection of a data object in accordance with the document view or the process view; and
displaying each data object corresponding to the selected node,
wherein organizing comprises locating the nodes of the different categories on a higher level within the hierarchical tree of nodes than the profile node and the variant node, and locating the profile node and the variant node on the same level within the hierarchical tree of nodes, and
wherein the hierarchical tree of nodes comprises:
a profile node, which includes a data object corresponding to at least one of a selection screen, function, view, object class, or operational method; and
a variant node, which includes an existing profile node, wherein a selection criteria or a list view layout of the existing profile node is varied based on a location of the variant node within the hierarchical tree.

21. The system of claim 8, wherein the nodes of the document view include data objects corresponding to warehouse requests, warehouse orders, and transfer orders and wherein the nodes of the process view include data objects corresponding to process steps for the processing of wares associated with inbound warehouse activities, outbound warehouse activities, and internal warehouse activities.

22. The computer-readable medium of claim 16, wherein the nodes of the document view include data objects corresponding to warehouse requests, warehouse orders, and transfer orders and wherein the nodes of the process view include data objects corresponding to process steps for the processing of wares associated with inbound warehouse activities, outbound warehouse activities, and internal warehouse activities.

23. A system for monitoring warehouse activities, the system comprising:
a storage unit for storing software programs, the software programs comprising:
an inbound monitor that monitors inbound information reflecting the status of wares destined for storage in a warehouse;
an internal monitor that monitors internal information reflecting movement of the wares within the warehouse;
an outbound monitor that monitors outbound information reflecting outbound processing of the wares; and a presentation module that organizes the inbound, internal, and outbound information into a hierarchical tree of nodes, in which a parent node corresponds to one of the inbound information, the internal information, or the outbound information and first and second child nodes associated with the parent node correspond respectively to a document view and a process view, wherein the document view includes information about documents associated with the inbound information, the outbound information, and the internal information, and the process view includes information about process steps associated with the inbound information, the outbound information, and the internal information, presents the hierarchical tree to a user, receives at least one instruction from the user selecting at least one of the nodes in the hierarchical tree, the at least one instruction including the selection of a data object in accordance with the document view or the process view, and displays each data object corresponding to the selected node; and a processor unit for executing the software programs, wherein organizing comprises locating the nodes of the different categories on a higher level within the hierarchical tree of nodes than the profile node and the variant node, and locating the profile node and the variant node on the same level within the hierarchical tree of nodes, and wherein presenting comprises displaying, for each one node, a context menu containing different options, wherein the different options differ according to a location level of the one node within the hierarchical tree of nodes.

24. A system for monitoring warehouse activities, the system comprising:

a storage unit for storing software programs, the software programs comprising:

an inbound monitor that monitors inbound information reflecting the status of wares destined for storage in a warehouse;

an internal monitor that monitors internal information reflecting movement of the wares within the warehouse;

an outbound monitor that monitors outbound information reflecting outbound processing of the wares; and a presentation module that organizes the inbound, internal, and outbound information into a hierarchical tree of nodes, in which a parent node corresponds to one of the inbound information, the internal information, or the outbound information and first and second child nodes associated with the parent node correspond respectively to a document view and a process view, wherein the document view includes information about documents associated with the inbound information, the outbound information, and the internal information, and the process view includes information about process steps associated with the inbound information, the outbound information, and the internal information, presents the hierarchical tree to a user, receives at least one instruction from the user selecting at least one of the nodes in the hierarchical tree, the at least one instruction including the selection of a data object in accordance with the document view or the process view, and displays each data object corresponding to the selected node; and a processor unit for executing the software programs, wherein organizing comprises locating the nodes of the different categories on a higher level within the hierarchical tree of nodes than the profile node and the variant node, and locating the profile node and the variant node on the same level within the hierarchical tree of nodes, and wherein the hierarchical tree of nodes comprises, a profile node, which includes a data object corresponding to at least one of a selection screen, function, view, object class, or operational method, and a variant node, which includes an existing profile node, wherein a selection criteria or a list view layout of the existing profile node is varied based on a location of the variant node within the hierarchical tree.

25. A computer-readable medium containing instructions for controlling a computer system to perform a method, the computer system having a processor for executing the instructions, the method comprising:

receiving inbound information reflecting the status of wares destined for storage in a warehouse;

receiving internal information reflecting movement of the wares within the warehouse;

receiving outbound information reflecting outbound processing of the wares;

organizing the storage of the inbound, internal, and outbound information into a hierarchical tree of nodes, in which a parent node corresponds to one of the inbound information, the internal information, or the outbound information and first and second child nodes associated with the parent node correspond respectively to a document view and a process view;

wherein:

the document view includes information about documents associated with the inbound information, the outbound information, and the internal information; and the process view includes information about process steps associated with the inbound information, the outbound information, and the internal information;

presenting the hierarchical tree to a user;

receiving at least one instruction from the user selecting one of the nodes in the hierarchical tree, the at least one instruction including the selection of a data object in accordance with the document view or the process view; and displaying each data object corresponding to the selected node, wherein organizing comprises locating the nodes of the different categories on a higher level within the hierarchical tree of nodes than the profile node and the variant node, and locating the profile node and the variant node on the same level within the hierarchical tree of nodes, and wherein presenting comprises displaying, for each one node, a context menu containing different options, wherein the different options differ according to a location level of the one node within the hierarchical tree of nodes.

26. A computer-readable medium containing instructions for controlling a computer system to perform a method, the computer system having a processor for executing the instructions, the method comprising:

receiving inbound information reflecting the status of wares destined for storage in a warehouse;

receiving internal information reflecting movement of the wares within the warehouse;

receiving outbound information reflecting outbound processing of the wares;

organizing the storage of the inbound, internal, and outbound information into a hierarchical tree of nodes, in which a parent node corresponds to one of the inbound information, the internal information, or the outbound information and first and second child nodes associated with the parent node correspond respectively to a document view and a process view;

wherein:

the document view includes information about documents associated with the inbound information, the outbound information, and the internal information; and the process view includes information about process steps associated with the inbound information, the outbound information, and the internal information;

presenting the hierarchical tree to a user;

receiving at least one instruction from the user selecting one of the nodes in the hierarchical tree, the at least one instruction including the selection of a data object in accordance with the document view or the process view; and displaying each data object corresponding to the selected node, wherein organizing comprises locating the nodes of the different categories on a higher level within the hierarchical tree of nodes than the profile node and the variant node, and locating the profile node and the variant node on the same level within the hierarchical tree of nodes, and wherein the hierarchical tree of nodes comprises, a profile node, which includes a data object corresponding to at least one of a selection screen, function, view, object class, or operational method, and a variant node, which includes an existing profile node, wherein a selection criteria or a list view layout of the existing profile node is varied based on a location of the variant node within the hierarchical tree.

* * * * *